(12) United States Patent
Yashiki et al.

(10) Patent No.: US 10,471,757 B2
(45) Date of Patent: Nov. 12, 2019

(54) OPTICAL ELEMENT FOR FORGERY PROOF

(71) Applicant: TOPPAN PRINTING CO., LTD., Taito-ku, Tokyo (JP)

(72) Inventors: Kazuhiro Yashiki, Tokyo (JP); Akira Nagano, Tokyo (JP); Keitaro Sugihara, Tokyo (JP); Tomoko Tashiro, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/522,349

(22) PCT Filed: Nov. 10, 2015

(86) PCT No.: PCT/JP2015/005608
§ 371 (c)(1),
(2) Date: Apr. 27, 2017

(87) PCT Pub. No.: WO2016/075928
PCT Pub. Date: May 19, 2016

(65) Prior Publication Data
US 2017/0334232 A1    Nov. 23, 2017

(30) Foreign Application Priority Data
Nov. 10, 2014  (JP) .................... 2014-227819

(51) Int. Cl.
*B42D 25/30* (2014.01)
*B42D 25/324* (2014.01)
(Continued)

(52) U.S. Cl.
CPC .......... *B42D 25/324* (2014.10); *B42D 25/23* (2014.10); *B42D 25/24* (2014.10); *B42D 25/29* (2014.10);
(Continued)

(58) Field of Classification Search
CPC ...... B42D 25/324; B42D 25/30; B42D 25/23; B42D 25/24; B42D 25/29; B42D 25/328;
(Continued)

(56) References Cited

U.S. PATENT DOCUMENTS 4,856,857 A * 8/1989 Takeuchi ............. B42D 25/324
359/3
5,856,048 A  1/1999 Tahara et al.
(Continued)

FOREIGN PATENT DOCUMENTS

JP    H 06/143529 A    5/1994
JP    2002/307879 A    10/2002
(Continued)

OTHER PUBLICATIONS

International Search Report for Application No. PCT/JP2015/005608, dated Feb. 16, 2016, English translation.
(Continued)

*Primary Examiner* — William R Alexander
(74) *Attorney, Agent, or Firm* — Squire Patton Boggs (US) LLP

(57) ABSTRACT

There is provided a versatile optical element applicable both to an electrode layer required in a bank bill field and to an optical element required in an ID field. In an optical element (1) according to one embodiment of the present invention, a first layer (2) is arranged on a second layer (3) having a relief structure on a surface thereof, and a first region (4) and a second region (5) are provided. Electromagnetic waves incident at a preset specific angle from a side of the first layer (2) are totally reflected due to at least one of the relief structure in the first region (4) and a ratio of a refractive index of the second layer (3) with respect to a refractive index of the first layer (2), the electromagnetic waves incident at the specific angle from the side of the first layer
(Continued)

(2) are not totally reflected but transmitted or refracted due to at least one of the relief structure in the second region (5) and the ratio of the refractive index of the second layer (3) with respect to the refractive index of the first layer (2), and only in case of observation performed from the specific angle on the first layer (2) side, the second region (5) has higher transparency than the first region (4), and a preset image is expressed by a transparency contrast therebetween.

14 Claims, 14 Drawing Sheets

(51) Int. Cl.
  *G07D 7/12*   (2016.01)
  *G02B 5/18*   (2006.01)
  *G02B 27/22*   (2018.01)
  *B42D 25/23*   (2014.01)
  *B42D 25/24*   (2014.01)
  *B42D 25/29*   (2014.01)
  *B42D 25/328*   (2014.01)
  *B42D 25/342*   (2014.01)
  *B42D 25/36*   (2014.01)
  *G07D 7/00*   (2016.01)
  *G07D 7/207*   (2016.01)

(52) U.S. Cl.
  CPC .......... *B42D 25/30* (2014.10); *B42D 25/328* (2014.10); *B42D 25/342* (2014.10); *B42D 25/36* (2014.10); *G02B 5/1828* (2013.01); *G02B 5/1842* (2013.01); *G02B 27/2214* (2013.01); *G07D 7/003* (2017.05); *G07D 7/12* (2013.01); *G07D 7/207* (2017.05); *G02B 5/1876* (2013.01)

(58) Field of Classification Search
  CPC ........................... B42D 25/342; G02B 5/1842; G02B 27/2214; G07D 7/12
  USPC ........................................................ 359/586
  See application file for complete search history.

(56) References Cited

U.S. PATENT DOCUMENTS

| | | | | |
|---|---|---|---|---|
| 8,147,945 | B2* | 4/2012 | Toda | G02B 5/1809 |
| | | | | 283/85 |
| 8,432,589 | B2* | 4/2013 | Tompkin | B44F 1/10 |
| | | | | 359/2 |
| 8,794,674 | B2* | 8/2014 | Heim | B42D 25/29 |
| | | | | 283/72 |
| 9,176,266 | B2* | 11/2015 | Fuhse | G02B 5/1842 |
| 9,354,364 | B2* | 5/2016 | Yashiki | G02B 5/1828 |
| 9,789,726 | B2* | 10/2017 | Fuhse | B42D 25/391 |
| 9,827,802 | B2* | 11/2017 | Fuhse | B42D 15/00 |
| 2005/0151368 | A1 | 7/2005 | Heim | |
| 2007/0273142 | A1 | 11/2007 | Tompkin et al. | |
| 2008/0231976 | A1* | 9/2008 | Commander | B44F 1/10 |
| | | | | 359/833 |
| 2008/0259456 | A1 | 10/2008 | Schilling et al. | |
| 2009/0162756 | A1 | 6/2009 | Staub et al. | |
| 2010/0165425 | A1* | 7/2010 | Tompkin | B44F 1/10 |
| | | | | 359/2 |
| 2012/0319395 | A1* | 12/2012 | Fuhse | G02B 5/1842 |
| | | | | 283/67 |
| 2014/0307321 | A1 | 10/2014 | Schilling et al. | |
| 2015/0070775 | A1 | 3/2015 | Yashiki | |
| 2016/0170219 | A1* | 6/2016 | Fuhse | B42D 25/29 |
| | | | | 283/91 |

FOREIGN PATENT DOCUMENTS

| | | |
|---|---|---|
| JP | 2002/357707 A | 12/2002 |
| JP | 2005-52946 A | 9/2005 |
| JP | 2005/301066 A | 10/2005 |
| JP | 2006/119258 A | 5/2006 |
| JP | 2006-276170 A | 10/2006 |
| JP | 2006/306085 A | 11/2006 |
| JP | 2007-168341 A | 7/2007 |
| JP | 2007-531906 A | 11/2007 |
| JP | 2008/183832 A | 8/2008 |
| JP | 2008-547040 A | 12/2008 |
| JP | 2009-532726 A | 9/2009 |
| JP | 2011/118138 A | 6/2011 |
| JP | 2012-238019 A | 12/2012 |
| WO | WO 2006/038120 A1 | 4/2006 |
| WO | WO 2012/055505 A1 | 5/2012 |
| WO | WO2013/180231 A1 | 12/2013 |

OTHER PUBLICATIONS

International Preliminary Report on Patentability dated May 26, 2017 in International Patent Application No. PCT/JP2015/005608, 7 pages.

Extended European Search Report dated Mar. 25, 2019 issued for European Patent Application No. 17750258.0, 10 pages.

Notice of Reasons for Refusal dated Jun. 4, 2019 issued for Japanese Patent Application No. 2016-558888, and English translation, 8 pages.

Renesse: "*Optical Document Security (Third Edition)*", Boston/London, ARTECH HOUSE, 2005, XP002789618; pp. 178, 196-197.

* cited by examiner

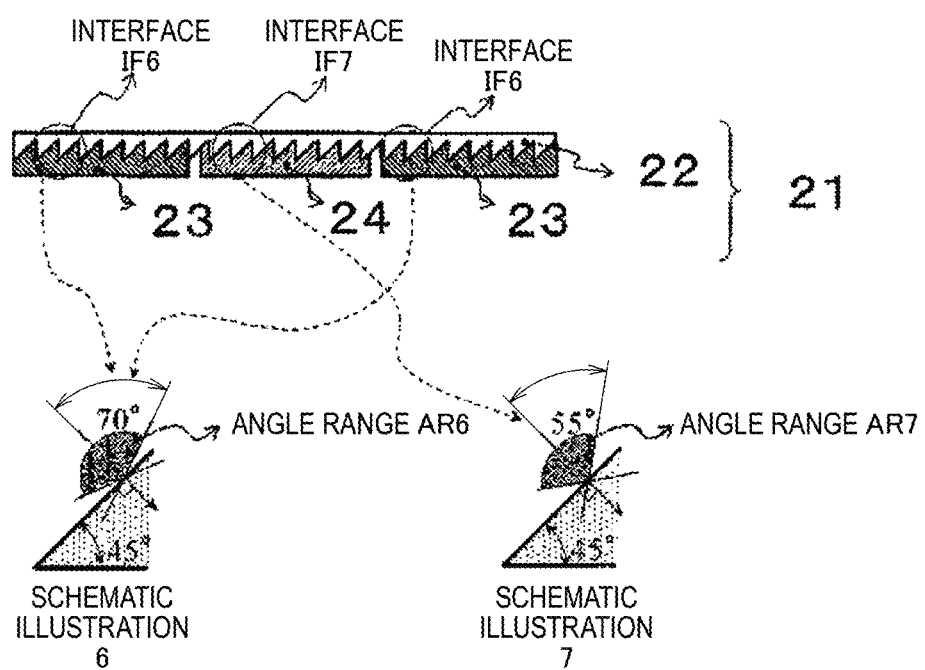
FIG. 12
FIG. 13A  FIG. 13F
FIG. 13B  FIG. 13G
FIG. 13C  FIG. 13H
FIG. 13D  FIG. 13I
FIG. 13E  FIG. 13J

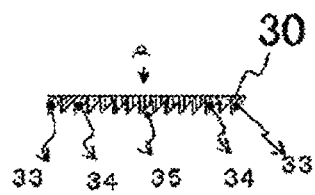
FIG. 16A
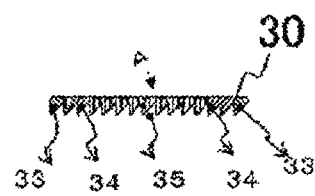
FIG. 16B
FIG. 16C
FIG. 16D
FIG. 16E
FIG. 16F
FIG. 17A
FIG. 17B
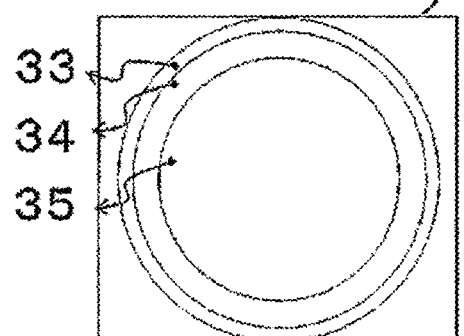
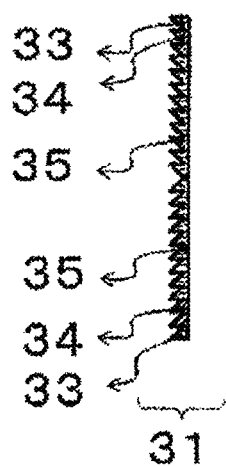

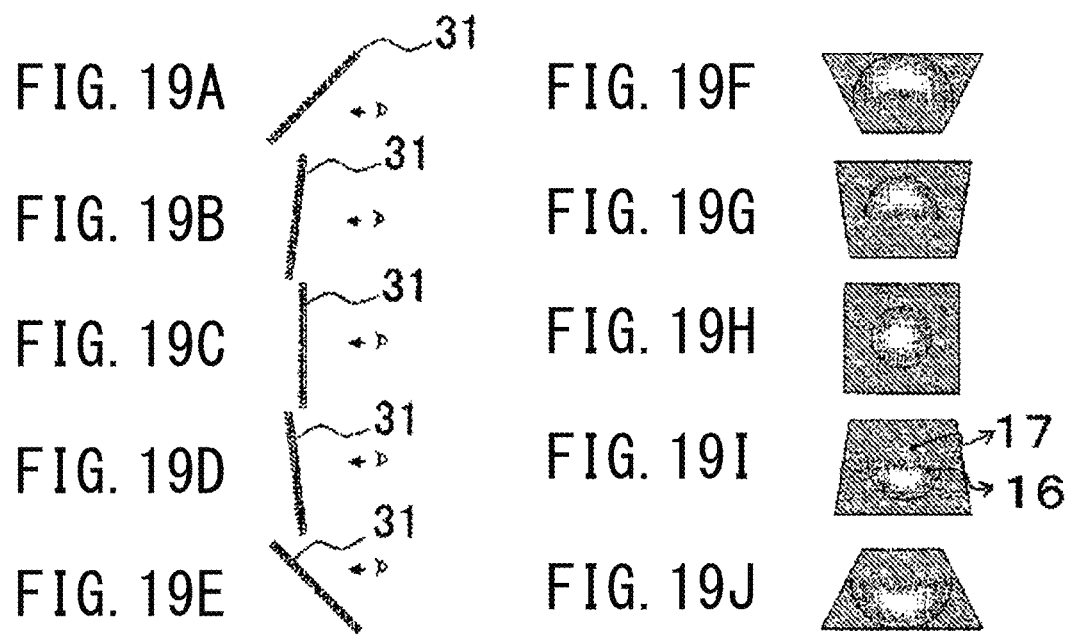
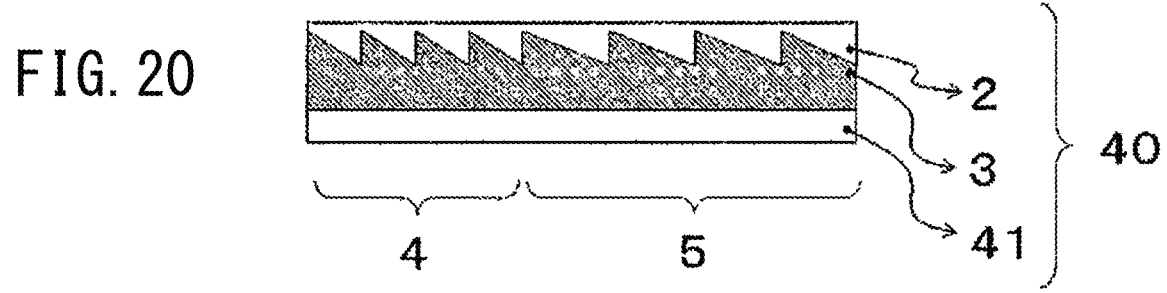

OPTICAL ELEMENT FOR FORGERY PROOF

TECHNICAL FIELD

The present invention relates to an optical element for forgery proof.

BACKGROUND ART

Technologies related to an optical element for forgery proof are disclosed in, for example, Patent Literatures 1 to 4.

CITATION LIST

Patent Literatures

PTL 1: JP 2012-238019 A
PTL 2: WO 2013/180231
PTL 3: JP 2006-276170 A
PTL 4: JP 2007-168341 A

SUMMARY OF INVENTION

Technical Problem

Among forge proof optical elements according to conventional art, the many versatile optical elements have faced difficulties in application thereof both as an optical element required in, for example, a bank bill field and as an optical element required in, for example, an identification (ID) field.

In view of the problem described above, the present invention has been made, and it is an object of the invention to provide a versatile optical element applicable both as an optical element required in, for example, a paper bill field (an optical element attached to a transparent base material) and as an optical element required in, for example, an ID field (an optical element attached onto an opaque base material or onto a printing layer or a pattern layer).

Solution to Problem

As means adapted to address the problem, an optical element according to one embodiment of the present invention is characterized in that a first layer is arranged on a second layer having a relief structure on a surface thereof, at least a first region and a second region are provided, and the first layer and the second layer have mutually different refractive indexes, electromagnetic waves incident at a preset specific angle from a side of the first layer are totally reflected due to at least one of the relief structure in the first region and a ratio of the refractive index of the second layer with respect to the refractive index of the first layer, the electromagnetic waves incident at the specific angle from the side of the first layer are not totally reflected but transmitted or refracted due to at least one of the relief structure in the second region and the ratio of the refractive index of the second layer with respect to the refractive index of the first layer, and only in case of observation performed from the specific angle on the first layer side, at least the second region has higher transparency than the first region, and a preset image is expressed by a transparency contrast between the first region and the second region.

Advantageous Effects of Invention

With the optical element according to one embodiment of the present invention, in use with a transparent base material provided, clearly different ways of viewing are achieved on a front side and a rear side, resulting in an optical element in which effects provided by rear side observation are not recognized in front side observation.

Moreover, in use with an opaque base material (a printing layer, a pattern layer) provided, a resulting optical element has different reflection and transmission patterns depending on an observation angle. Thus, a reflection layer of metal or a highly refractive film is no longer required, resulting in a preferable optical element for forgery proof as a transparent optical element which permits transmission at a given incidence angle and permits reflection at a different given angle.

As described above, with the optical element according to one embodiment of the invention, it is possible to provide a versatile optical element applicable both to an optical element required in, for example, a bank bill field and to an optical element required in, for example, an ID field.

BRIEF DESCRIPTION OF DRAWINGS

FIG. 7A is an elevation view and FIG. 7B is a sectional view.

FIG. 10A is an elevation view and FIG. 10B is a sectional view.

FIG. 12 is a diagram illustrative of an optical element according to a fourth embodiment of the invention.

FIGS. 13A to 13J are pattern diagrams illustrative of flash effects provided by the optical element of FIG. 12.

FIGS. 14 A and 14B illustrate a structure of an optical element according to a fifth embodiment of the invention.

FIGS. 16A to 16F are pattern diagrams illustrative of moving effects provided by the optical element of FIG. 14.

FIGS. 17A and 17B illustrate a structure of an optical element according to a sixth embodiment of the invention. FIG. 17A is an elevation view and FIG. 17B is a sectional view.

FIGS. 19A to 19J are pattern diagrams illustrative of moving effect provided by the optical element of FIG. 17.

FIG. 20 is a sectional view illustrative of a structure of an optical element according to a seventh embodiment of the invention.

DESCRIPTION OF EMBODIMENTS

Figure 1:
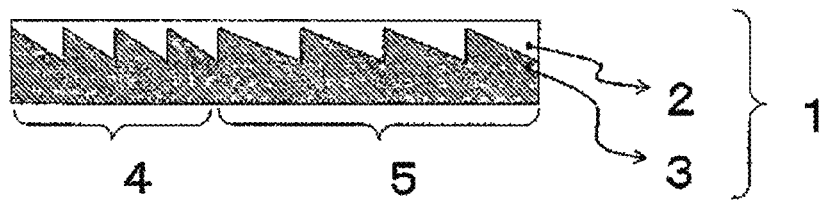
FIG. 1 is a sectional view illustrative of a structure of an optical element according to a first embodiment of the present invention.

Embodiments according to the present invention will be described below with reference to the drawings. Note that many specific detailed parts will be written in the detailed description below for providing complete understanding of the embodiments of the invention. However, it would be obvious that it is possible to carry out one or more of the embodiments even without the specific detailed parts. In addition, a well-known structures and devices are illustrated in schematic illustrations for the simplified drawings. Moreover, in the drawings, components exerting the same or similar function will be marked with the same reference numerals, and an overlapping description thereof will be omitted.

First Embodiment

First, an optical element 1 according to the first embodiment will be described.

The optical element 1 according to the present embodiment is formed of: a first layer 2 on a surface of which a relief structure including tilt planes is formed; and a second layer which is arranged to fill the relief structure, as illustrated in FIG. 1. The first layer 2 and the second layer 3 are formed of materials with different refractive indexes. Moreover, the optical element 1 also has a first region 4 and a second region 5 having different tilt angles for oblique surfaces included in the relief structure. Note that the aforementioned tilt planes corresponds to "tilt planes 6" of FIG. 2 and "tilt planes 8" of FIG. 3.

The tilt angle of the tilt plane (hereinafter also simply expressed as "oblique surface") in each of the regions is constant. Note that neither a metal reflection layer nor a highly refractive evaporated film lies between the first layer 2 and the second layer 3.

The first layer 2 has a higher refractive index than the second layer 3, and light incident from a first layer 2 side is totally reflected upon incidence at an angle equal to or greater than a critical angle formed with respect to a perpendicular line of the tilt plane while the aforementioned light is transmitted through an interface to travel into the second layer 3 upon incidence at an angle less than the critical angle formed with respect to the perpendicular line of the tilt plane.

Figure 2:
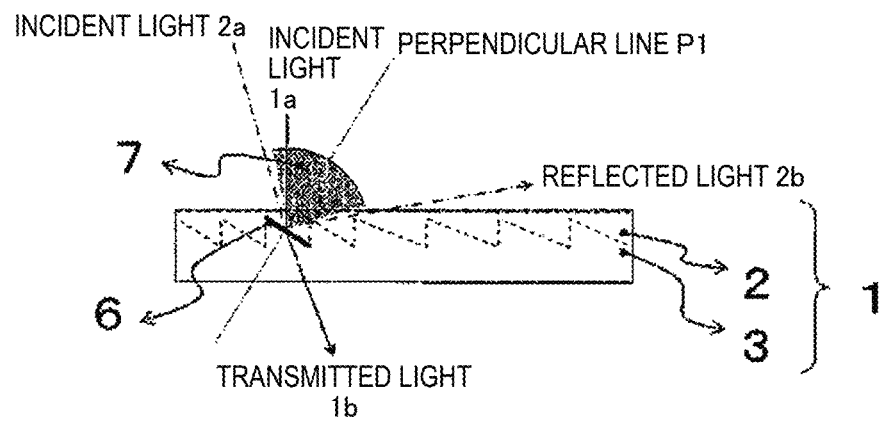
FIG. 2 is an illustration of optical paths of light incident on a first region of the optical element of FIG. 1.

FIG. 2 is an illustration of optical paths of light incident on the first region 4 of the optical element 1. Here, the optical paths of the light incident on the first region 4 in FIG. 1 from the first layer 2 side will be described.

An incidence angle range 7 indicates an incidence angle range less than the critical angle calculated based on the refractive indexes of the first layer 2 and the second layer 3. "Incident light 1a" as light incident within the incidence angle range 7 passes through the interface between the first layer 2 and the second layer 3 and is refracted by a refractive index difference therebetween, turning into "transmitted light 1b". On the other hand, "incident light 2a" as light incident at an angle out of the incidence angle range 7 is incident light at an angle equal to or greater than the critical angle calculated based on the refractive indexes of the first layer 2 and the second layer 3, and is thus totally reflected on the interface between the first layer 2 and the second layer 3, turning into "reflected light 2b".

Note that the total reflection is a phenomenon which occurs only upon travel of electromagnetic waves from a medium with a high refractive index to a medium with a low refractive index. Thus, the phenomenon of total reflection does not occur with the light incident from a second layer 3 side. Therefore, even when a ratio of the refractive index of the first layer 2 with respect to the refractive index of the second layer 3 is 1.33, light incident from any angle region is also substantially transmitted.

For example, in a case where the optical element 1 is placed on a printed material with the first layer 2 located on an observer side, the optical element 1 is transparent in a specific angle range, permitting confirmation of the printed material located below the optical element 1, while the optical element 1 is opaque within an angle range out of the specific angle range (an angle range of the critical angle or above), thus not permitting the confirmation of the printed material located below the optical element 1.

On the other hand, in a case where the optical element 1 is placed on the printed material with the second layer 3 located on the observer side, the optical element 1 is transparent in any angle range, thus permitting the confirmation of the printed material located below the optical element 1 in any angle range.

As described above, characteristics of total reflection based on the critical angle are utilized in the present embodiment. The characteristics make it possible to vary transparency of the optical element 1 depending on an observation angle in observation performed from a specific angle, and also make it possible to provide different optical effects on a front side and a rear side.

Note that FIG. 2 illustrates a perpendicular line P1 which is perpendicular to the tilt plane 6.

Figure 3:
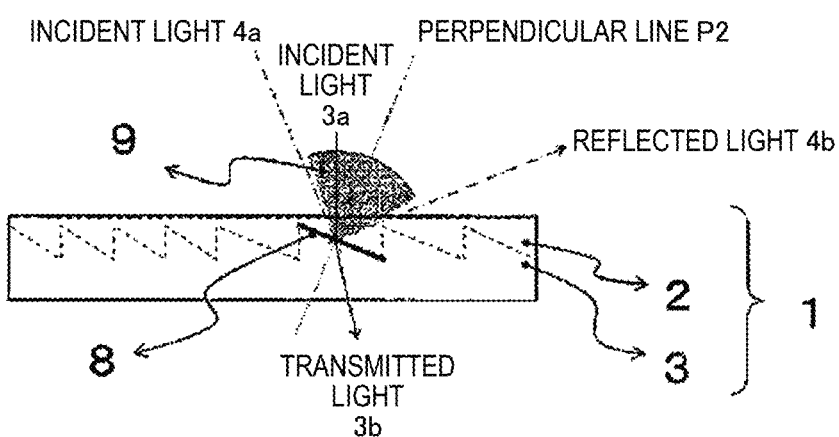
FIG. 3 is an illustration of optical paths of light incident on a second region of the optical element of FIG. 1.

FIG. 3 illustrates optical paths of light incident on the second region 5 of the optical element 1 from the first layer 2 side.

An incidence angle range 9 indicates an incidence angle range less than the critical angle calculated based on the refractive indexes of the first layer 2 and the second layer 3. Here, based on the fact that a common material is used for the first region 4 and the second region 5, the incidence angle range 7 in FIG. 2 and the incidence angle range 9 in FIG. 3 have the same angles. However, since the tilt angles of the tilt planes of the first region 4 and the second region 5 are different from each other, following three phenomena occur depending on incidence angles of light incident on the tilted plane of the optical element 1 from the first layer 2 side.

(1) A phenomenon in which the light is transmitted through the first region 4 but is totally reflected on the second region 5 at a specific incidence angle.

(2) A phenomenon in which the light is totally reflected on both the first region 4 and the second region 5 at a specific incidence angle.

(3) A phenomenon in which the light is transmitted through both the first region 4 and the second region 5 at a specific incidence angle.

The specific incidence angles at which the aforementioned phenomena occur are adjusted by a design of each of the regions.

For example, it is possible to adjust the incidence angles, at which the aforementioned phenomena occur, by varying "the tilt angle of the plane", "the refractive index of the first layer 2", and "the refractive index of the second layer 3", and it is also possible to create various patterns and optical effects.

FIG. 3 illustrates a perpendicular line P2 which is perpendicular to the tilt plane 8.

Figure 4:
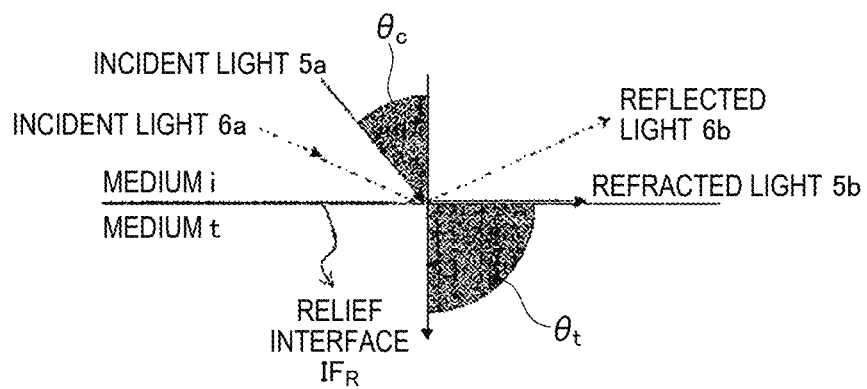
FIG. 4 is a sectional view illustrative of a critical angle.

FIG. 4 is a sectional view illustrative of the critical angle.

A medium i and a medium t have a horizontal interface, and a refractive index of the medium i is $n_i$ and a refractive index of the medium t is $n_t$. A critical angle $\theta_c$ is obtained by Formula 3 below based on Schnell law and the definition of the refractive indexes:

$$\sin \theta_c = n_t/n_i \quad \text{(Formula 3)}$$

Incident light 5a incident at the critical angle $\theta_c$ turns into refracted light 5b which is directed in a direction with a refraction angle $\theta_t$ of 90° (in a direction along an interface between the medium i and the medium t). Incident light 6a as light incident at an angle greater than the critical angle $\theta_c$ is totally reflected, turning into reflected light 6b.

Although not illustrated, light incident at an angle smaller than the critical angle $\theta_c$ is refracted at a refraction angle in accordance with the Schnell law and transmitted through the interface between the two media.

Note that actual intensity of reflected waves gradually varies depending on an incidence angle. An increase in the incidence angle of incident light to approach the critical angle $\theta_c$ causes a component of refracted waves transmitted through the medium t to approach a water surface and also gradually weaken. Then the intensity of the reflected waves gradually strengthens, and upon excess of the incidence angle over the critical angle $\theta_c$, the all are totally reflected.

Note that the totally reflected light is actually further subjected to repeated reflection, transmission, and refraction by the relief and the layer surfaces while becoming gradually weaker. The total reflection is simply described in the present embodiment, but means that the light becomes weaker through total reflection on the relief interface $IF_R$ and/or subsequent reflection, transmission, refraction, and scattering. It is possible to interpret multiplex reflection, transmission, and refraction as light scattering in a plurality of directions, and it is permitted to design a relief structure for this end.

It is obvious from Formula 3 that a prerequisite for total reflection occurring at an incidence angle equal to or greater than the critical angle $\theta_c$ is $n_t < n_i$. Specifically, on an interface formed by two media with different refractive indexes, light incident from a high refractive index side is totally reflected upon incidence at an angle equal to or greater than the critical angle $\theta_c$. Light incident from a low refractive index side is not totally reflected based on the critical angle $\theta_c$.

Applying the phenomena, it is possible in the present embodiment to obtain a pattern formed by a transmission region and a non-transmission region at a specific angle or above and to provide different optical phenomena on a front side and a rear side.

Figure 5:
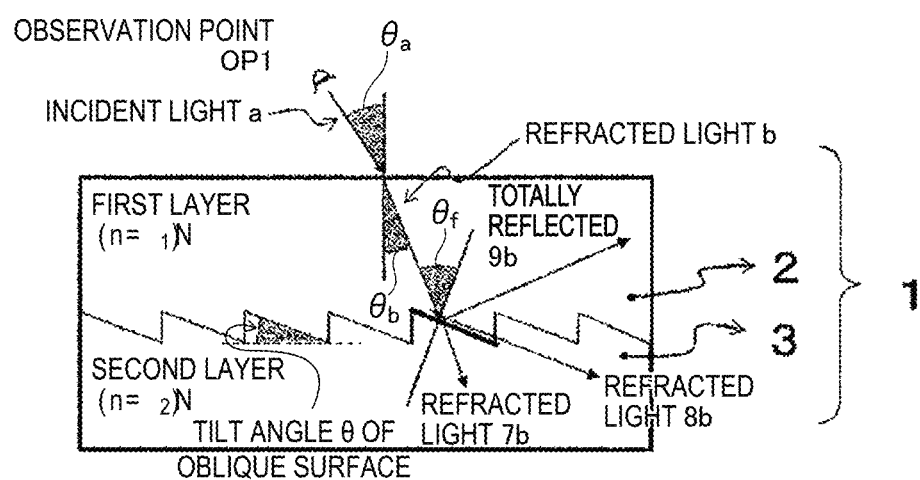
FIG. 5 is a sectional view illustrative of an example of assumed optical paths of light incident on a first layer.

More specifically, now assume optical paths as in FIG. 5. In case of observation performed from an observation point OP1, "incident light a" incident on the optical element 1 at an incidence angle $\theta_a$ is refracted on an interface between the air and the first layer 2 at a refraction angle $\theta_b$, turning into "refracted light b". Then the light is incident on the oblique surface at an incidence angle $\theta_f$. The light turns into "refracted light 7b" when the incidence angle $\theta_f$ is less than the critical angle while the light turns into "refracted light 8b" when the incidence angle $\theta_f$ is the critical angle. Moreover, the light turns into "totally reflected light 9b" when the incidence angle $\theta_f$ has a value greater than that of the critical angle. Note that the critical angle is determined by a refractive index ratio between the two layers sandwiching the interface, as described above. It is possible in the present embodiment to perform patterning by providing the two regions, i.e. the first region 4 where the incidence angle $\theta_f$ is totally reflected at the given observation point OP1 and the second region 5 where the light is refracted and transmitted. It is also further possible to gradually vary the pattern through a gradual variation in the observation point OP1 (a gradual variation in the incidence angle $\theta_a$).

It is possible to express prerequisites for the first region 4 and the second region 5 by using the incidence angles on the oblique surfaces of the aforementioned two regions, i.e., the first region 4 and the second region 5, and the critical angle obtained based on the refractive indexes of the first layer 2 and the second layer 3 and the refractive index ratio between the first layer 2 and the second layer 3.

More specifically, the incidence angle $\theta_{f1}$ on the first region 4 where the light is totally reflected on the oblique surface having a tilt angle $\theta_1$ and the incidence angle $\theta_{f2}$ on the second region 5 where the light is refracted and transmitted on the oblique surface having a tilt angle $\theta_2$ are expressed by Formula 4 below.

$$\theta_{f1} \geq \arcsin(N_2/N_1) > \theta_{f2} \quad \text{(Formula 4)}$$

where $N_1$ denotes the refractive index of the first layer 2, and $N_2$ denotes the refractive index of the second layer 3.

In a case where the refractive indexes of the first layer 2 and the second layer 3 differ between the first region 4 and the second region 5, the incidence angles are expressed by Formula 5-1 and Formula 5-2 below:

$$\theta_{f1} \geq \arcsin(N_2/N_1) \quad \text{(Formula 5-1)}$$

$$\arcsin(N_4/N_3) > \theta_{f2} \quad \text{(Formula 5-2)}$$

where $N_1$ denotes the refractive index of the first layer 2 in the first region 4, $N_2$ denotes the refractive index of the second layer 3 in the first region 4, $N_3$ denotes the refractive index of the first layer 2 in the second region 5, and $N_4$ denotes the refractive index of the second layer 3 in the second region 5.

Figure 6:
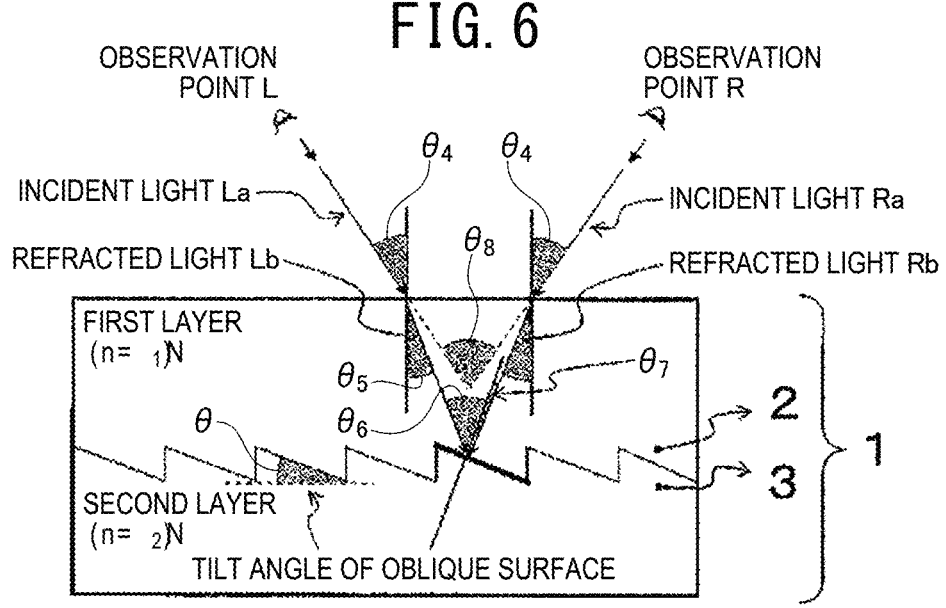
FIG. 6 is a sectional view illustrative of assumed optical paths in a case where a parallax image is created.

FIG. 6 illustrates assumed optical paths in a case where, for example, a parallax image causing a stereoimage is created.

In case of observation performed from an observation point L (for example, a left eye), "incident light La" incident at an incidence angle $\theta_4$ is refracted on an interface between the air and the first layer 2 at a refraction angle $\theta_5$, turning into "refracted light Lb". Then the light gets incident on the oblique surface at an incidence angle $\theta_6$. The light is transmitted when the incidence angle $\theta_6$ is less than the critical angle while the light is totally reflected when the incidence angle $\theta_6$ is greater than the critical angle.

In case of observation performed from an observation point R (for example, a right eye), "incident light Ra" incident at an incidence angle $\theta_4$ is refracted on an interface between the air and the first layer 2 at a refraction angle $\theta_5$, turning into refracted light Rb". Then the light gets incident on the oblique surface at an incidence angle $\theta_7$. The light is transmitted when the incidence angle $\theta_7$ is less than the critical angle while the light is totally reflected when the incidence angle $\theta_7$ is greater than the critical angle. Note that $\theta_8$ denotes a convergence angle.

It is possible to obtain a parallax image by creating a region where total reflection occurs at one of the incidence angles $\theta_6$ and $\theta_7$ while transmission occurs at another one of the incidence angles.

It is possible to express a prerequisite for a region where such a parallax image appears by an tilt angle $\theta$ of the oblique surface of the relief structure with respect to the plane of the optical element, the refraction angle $\theta_5$ of light incident at the convergence angle $\theta_8$, the refractive index $N_1$ of the first layer 2, and the refractive index $N_2$ of the second layer 3.

More specifically, there are three cases classified depending on a difference between a value of the refraction angle $\theta_5$ of the light incident on the first layer 2 at the convergence angle $\theta_8$ and a value of the tilt angle $\theta$ of the oblique surface of the relief structure with respect to the plane of the optical element, which are expressed by Formulae 6 to 8 below.

$$\theta+\theta_5 \geq \arcsin(N_2/N_1) > \theta-\theta_5 \quad \text{(Formula 6)}$$

where $\theta > \theta_5$.

$$2\times\theta_5 \geq \arcsin(N_2/N_1) \quad \text{(Formula 7)}$$

where $\theta = \theta_5$.

$$\theta+\theta_5 \geq \arcsin(N_2/N_1) > \theta_5-\theta \quad \text{(Formula 8)}$$

where $\theta < \theta_5$,
$N_1$ denotes the refractive index of the first layer 2,
$N_2$ denotes the refractive index of the second layer 3,
$\theta$ denotes the tilt angle of the oblique surface of the relief structure with respect to the plane of the optical element, and
$\theta_5$ denotes the refraction angle of the light incident at the convergence angle.

Moreover, the refraction angle $\theta_5$ is expressed by Formulae 9-1 and 9-2 below:

$$\theta_5 = \arcsin[\sin(\theta_8/2)/N_1] \quad \text{(Formula 9-1)}$$

$$= \arcsin[\sin(\theta_4)/N_1] \quad \text{(Formula 9-2)}$$

where
$\theta_8$ denotes the convergence angle, and
$N_1$ denotes the refractive index of the first layer 2.

Satisfying Formulae 6 to 8 above makes it possible to obtain a region where lateral parallax occurs, use of which makes it possible to provide cube representation with a parallax image.

The obtained stereoimage is formed by a transmission region or a total reflection region. Especially in a case where the stereoimage is created with the transmission region, it is possible to create a transparent stereoscopic image. Moreover, providing a colored layer on the ground makes it possible to color the stereoimage, providing favorable designability, which exhibits more excellence than existing volume holograms, calculation holograms, etc.

Moreover, it is also possible to create a mechanically detectable stereoimage by providing the ground with a mechanically detectable security ink, for example, a fluorescent, light storing, or cholesteric liquid crystal or magnetic ink, and such an application further improves a forge proof effect.

Further, creating a stereoimage in the transmission region and providing two layers which causes moire with the stereoimage (optical element) in between causes moire only on a transmissive stereoimage, providing an effect such that a pattern of the moire seems to be stereospically attached to the stereoimage. The two layers causing the moire interfere using the optical element as a spacer, thus causing different patterns depending on observation angles, and such an effect further increases a stereoscopic effect.

Second Embodiment

Next, an optical element 10 according to the second embodiment will be described.

Figure 7A:
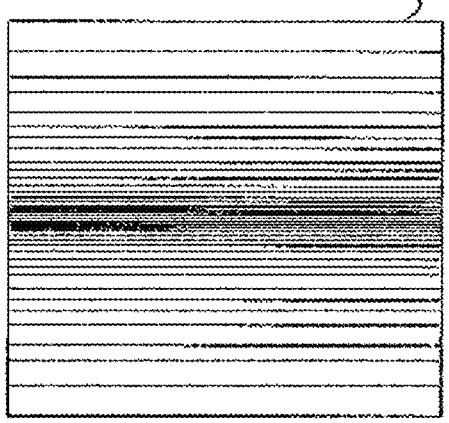
FIGS. 7A and 7B illustrate a structure of an optical element according to a second embodiment of the invention.
Figure 7B:
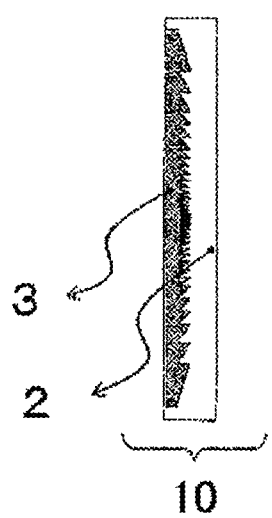

The optical element 10 is an example for configuration, as illustrated in FIG. 7, which is divided into more complicated regions than the optical element 1 of FIG. 1. The optical element 10 varies tilt angles of tilt planes with respect to one axis.

Figure 8:
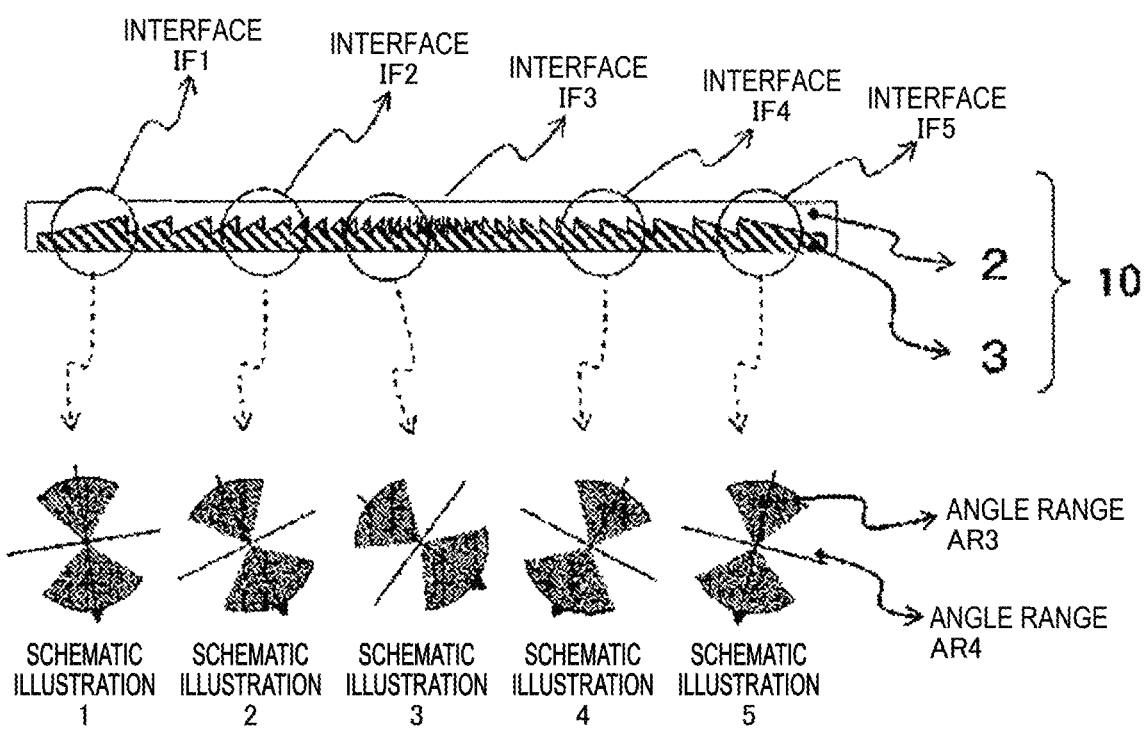
FIG. 8 is a pattern diagram illustrative of a critical angle in each region of FIG. 7.

FIG. 8 is a pattern diagram illustrative of a critical angle in each region of FIG. 7.

The critical angles at interfaces IF1 to IF5 are illustrated in schematic illustrations 1 to 5. An angle range AR3 denotes an angle region less than the critical angle, and light incident at the aforementioned angle is refracted in an angle range AR4 and transmitted to the second layer 3 side. Light incident perpendicularly to the optical element 10 is totally reflected at the interfaces IF1 and IF5 while the light is transmitted through the interfaces IF2, IF3, and IF4. However, a variation in the incidence angle of the incident light results in a variation in the interface through which the light is transmitted.

FIG. 9 is a pattern diagram illustrative of visual effects provided by the optical element of FIG. 7.

Figure 9A:
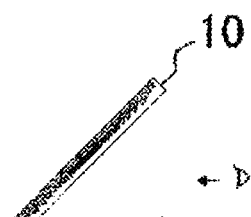
FIGS. 9A to 9F are pattern diagrams illustrative of visual effects provided by the optical element of FIG. 7.
Figure 9B:
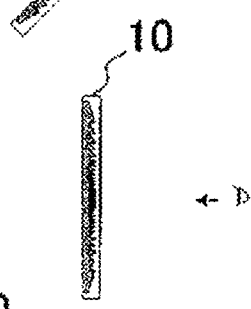
Figure 9C:
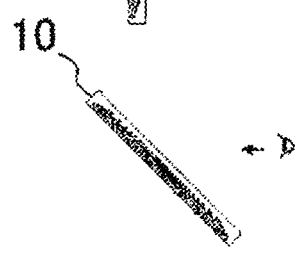
Figure 9D:
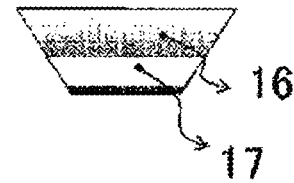
Figure 9E:
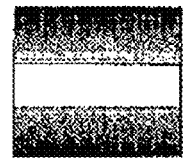
Figure 9F:
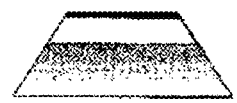

In case of observation performed from the first layer 2 side with an observation point fixed, observing the optical element 10 while tilting the optical element 10 sequentially from FIG. 9A to FIG. 9C permits observation of effects that a transparent bar moves vertically with respect to the drawing as illustrated in FIGS. 9D to 9F.

Here, a transmission pattern 16 and a total reflection pattern 17 are illustrated in FIGS. 9D to 9F.

The actual optical element 10 has a region with a large number of tilt angles, thus providing a smoothly moving effect as the optical element 10 is tilted.

Moreover, based on the aforementioned phenomenon that the reflectance gradually increases as the angle approaches the critical angle, the transparent pattern 16 has higher reflectance towards an end part thereof, resulting in a slightly graded pattern as in FIGS. 9D to 9F. Through the gradation of the transmittance, a "transparent bar" drawn in the transparent pattern 16 is observed as if the transparent pattern 16 has a stereoscopic effect.

Third Embodiment

An optical element 20 according to the third embodiment will be described.

The optical element 20 has configuration, as illustrated in FIG. 10, which is divided into more complicated regions than the optical element 1 of FIG. 1 and the optical element of FIG. 7. That is, the optical element 20 has configuration such that tilt angles of tilt planes vary concentrically.

Figure 10A:
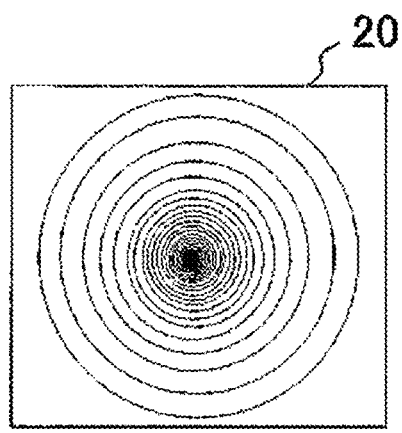
FIGS. 10A and 10B illustrate a structure of an optical element according to a third embodiment of the invention.

Note that a Fresnel-like lens is drawn n FIG. 10A, but it is not essential in the present embodiment to have a structure of, for example, a lens shape having a focus for use of the critical angle.

Figure 10B:
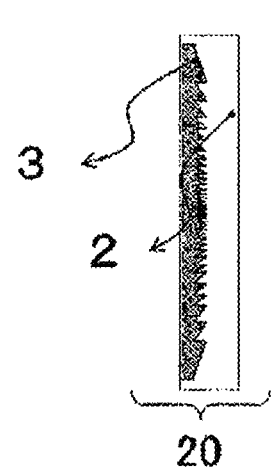
Figure 11A:
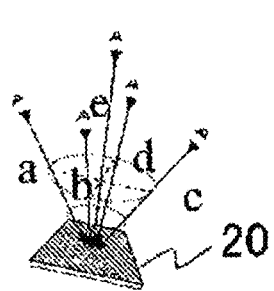
FIGS. 11A and 11B are pattern diagrams illustrative of visual effects provided by the optical element of FIGS. 10A and 10B.
Figure 11B:
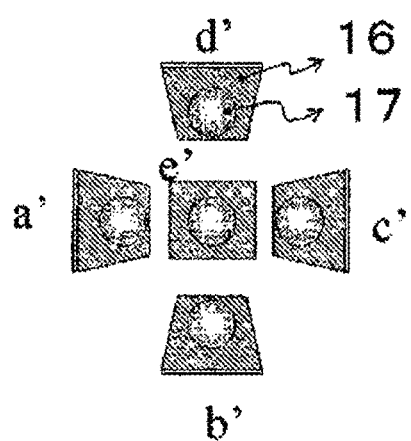

FIGS. 11A and 11B are pattern diagrams illustrative of visual effects provided by the optical element 20 of FIGS. 10A and 10B.

FIG. 11A illustrates observed angles with respect to the optical element 20, and FIG. 11B illustrates observed images corresponding to FIG. 11A. The images are also composed of a transmission pattern 16 located in a transmission region and a total reflection pattern 17 located in a total reflection region as is the case with the optical element 10.

Based on the aforementioned phenomenon that the reflectance gradually increases while approaching the critical angle, the transparent pattern 16 has higher reflectance towards an end part thereof, providing a slightly graded pattern at the end part of the circularly formed transmission pattern 16 as illustrated in FIG. 11. Through the gradation of the transmittance, the "transparent circle" is observed as if the transparent circle is a spherical body with a stereoscopic effect. In addition, the spherical body is viewed in a manner such as to move, depending on an observation angle.

Here, with respect to the observation angle "e" perpendicular to the optical element 20, a position of the spherical body provided by the transmission region varies at the observation angles "a", "b", "c", and "d". As a result of varying the observation angle in the aforementioned manner, the sphere with a stereoscopic effect appears as if the spherical body is moving, which further provides a steric effect.

Fourth Embodiment

Next, an optical element 21 according to the fourth embodiment will be described.

The optical element 21 according to the fourth embodiment has, as illustrated in FIG. 12, a first layer 22 with a refractive index of 1.40, a second layer 23 with a refractive index of 1.49, and a second layer 24 with a refractive index of 1.7, sandwiching a relief structure of a cutting blade shape having oblique surfaces tilted at 45°. It is possible to calculate, by Formula 3, critical angles at an interface IF6 where the first layer 22 and the second layer 23 make contact with each other and at an interface IF7 where the first layer 22 and the second layer 24 makes contact with each other.

The interface IF6 has a critical angle of 70° in the present embodiment, as in a schematic illustration 6. Moreover, the interface IF7 has a critical angle of 55°, as in a schematic illustration 7. As described above, even with the same relief structure, the critical angle is varied by varying a ratio between the refractive index of the first layer 22 and the refractive indexes of the second layers 23 and 24.

FIG. 13 is a pattern diagram illustrative of flash effects provided by the optical element 21 of FIG. 12.

The optical element 21 according to the fourth embodiment has a pattern formed by a transmission pattern 25 and a total reflection pattern 26 as in FIG. 13(i). As is found through comparison between the schematic illustrations 6 and 7 of FIG. 12, an incidence angle which permits transmission through the interface IF6 and total reflection on the interface IF7 is only present at 15°. Incidence angles other than the aforementioned incidence angle only permit transmission through all the surfaces or total reflection on all the surfaces.

As a result of observation with the optical element 21 tilted from FIGS. 13A to 13E, corresponding patterns as in FIGS. 13F to 13J are observed. Specifically, a sun mark appears only in FIG. 13D (only in a region with an incidence angle as small as 15°). That is, it is possible for the optical element 21 according to the fourth embodiment to make a hidden pattern, which is confirmable only at the small observation angle, appear in a flashing manner. It is possible to say that such a special optical effect has a high forge proof effect.

Fifth Embodiment

Next, an optical element 30 according to the fifth embodiment will be described.

Figure 14A:
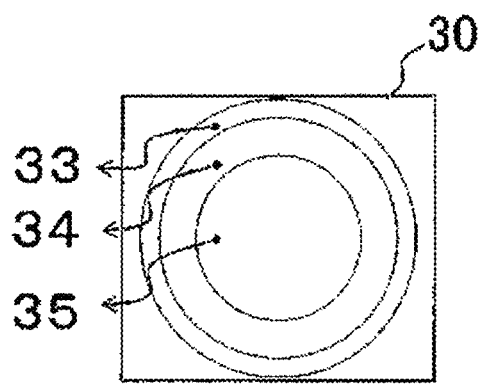
FIG. 14A is an elevation view and FIG. 14B is a sectional view.

The optical element 30 is composed of: first layers 33, 34, and 35 which are arranged concentrically as in an elevation view of FIG. 14A.

Figure 14B:
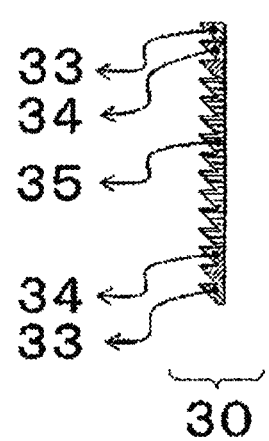

Moreover, the optical element 30 is formed by: a first layer 33 with a refractive index of 1.69, a first layer 34 with a refractive index of 1.5, and a first layer 35 with a refractive index of 1.4, which are formed of a relief structure of a cutting edge blade at 45° as illustrated in a sectional view of FIG. 14B. For an easier description, a second layer in the optical element 30 as the air is omitted from the illustration, serving as a medium with a refractive index of 1.0.

Then positions of the optical element 30 corresponding to the first layers 33, 34, and 35 form individual regions.

Figure 15:
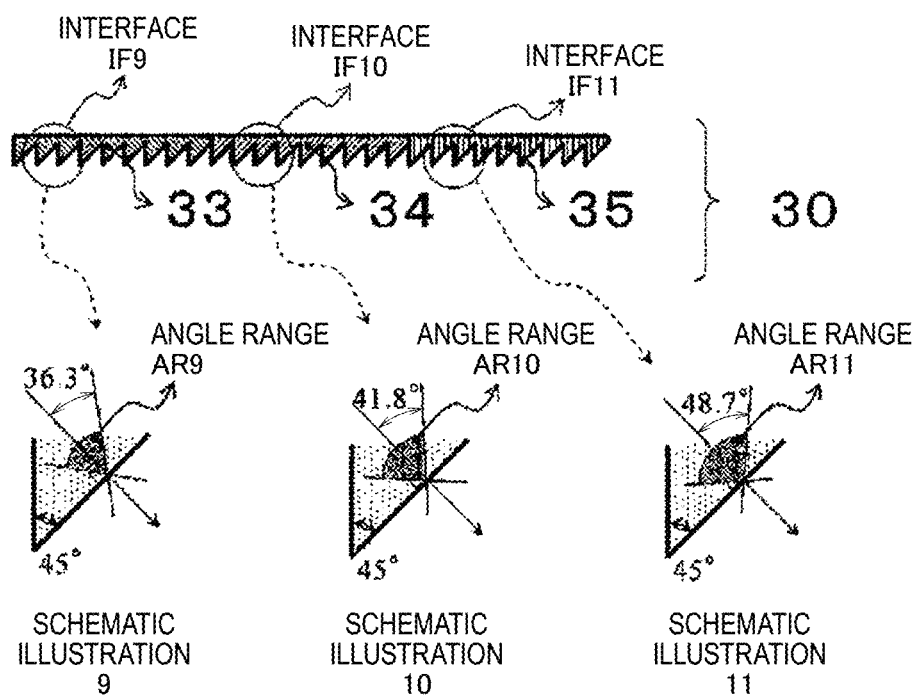
FIG. 15 is a pattern diagram illustrative of a critical angle in each region of FIG. 14.
Figure 18A:
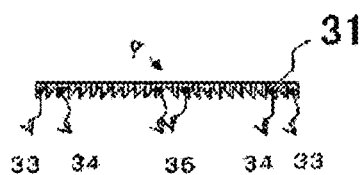
FIGS. 18A to 18F are pattern diagrams illustrative of visual effects in respective regions of FIGS. 17A and 17B.
Figure 18B:
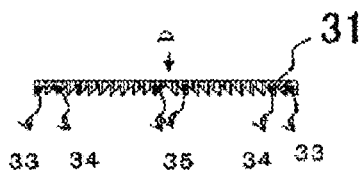
Figure 18C:
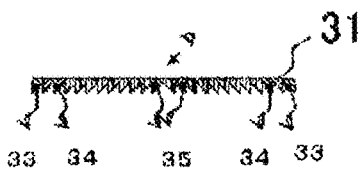
Figure 18D:
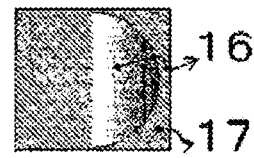
Figure 18E:
Figure 18F:
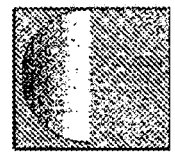

FIG. 15 is a pattern diagram illustrative of critical angles in the respective regions corresponding to the first layers 33, 34, and 35 in FIG. 14.

Here, an interface IF9 as an interface between the first layer 33 and the air has a critical angle of 36.3° based on calculation by Formula 3, as in a schematic illustration 9. An interface IF10 as an interface between the first layer 34 and the air has a critical angle of 41.8° as in a schematic illustration 10. An interface IF11 as an interface between the first layer 35 and the air has a critical angle of 45.6° as in a schematic illustration 11.

As a result of comparison between the schematic illustrations 9 to 11, light incident perpendicularly to the optical element 30 is transmitted through the interface IF10 and the interface IF9 in order just mentioned with an increase in the incidence angle.

FIG. 16 is a pattern diagram illustrative of moving effects provided by the optical element 30 of FIG. 14.

A pattern is composed of a transmission pattern 16 and a total reflection pattern 17, and by varying an observation angle from FIGS. 16A to 16C, corresponding transmission patterns 16 are observed in FIGS. 16D to 16F in accordance with the variation in the observation angle. That is, the transmission pattern 16 becomes gradually larger, causing a moving effect like a moving image.

Sixth Embodiment

Next, an optical element 31 according to the sixth embodiment will be described.

The optical element 31 according to the sixth embodiment is formed by inverting the relief structure of the optical element 30 of FIG. 14 at a central part with cutting blades formed in symmetry from the center, as illustrated in FIG. 17.

FIG. 18 is a pattern diagram illustrative of visual effects provided in respective regions of FIG. 17.

Due to the structure inverted with respect to the center, as illustrated in FIG. 18, a transmission region is only half viewed in oblique observation. Observation in a direction perpendicular to the optical element 31 results in observation of a circle formed by a transmission pattern 16 and a total reflection pattern 17, but the oblique observation results in a larger circle of the transmission pattern 16 and at the same time formation of the total reflection pattern 17 at a half of the pattern with respect to the center as a border.

FIG. 19 is a pattern diagram illustrative of moving effects provided by the optical element 31 of FIG. 17.

The optical element 31 has a pattern formed by the transmission pattern 16 and the total reflection pattern 17 as in FIG. 19(*i*). As a result of observation with the optical element 31 tilted from FIGS. 19A to 19E, corresponding pattern variations as in FIGS. 19F to 19J are observed.

Seventh Embodiment

Next, an optical element 40 according to the seventh embodiment will be described.

The optical element 40 according to the seventh embodiment has a background layer 41 of a printing layer or a colored layer provided on a second layer 3 side of the optical element 1 illustrated in FIG. 1, as illustrated in FIG. 20.

Since total reflection or transmission dependent on an incidence angle by a first layer 2 and the second layer 3 differs between the first region 4 and a second region 5 having planes with different tilt angles, the background layer 41 is visible only in the first region 4 at a specific angle. The background layer 41 here corresponds to the printing layer, the colored layer, or a structural color layer 51 (61) to be described later on. The printing layer may be printed on a base material of, for example, paper or plastic, and a printing method may be any of well-known methods such as an inkjet method, a transfer method, or a laser engrave method.

Eighth Embodiment

Next, an optical element 50 according to the eighth embodiment will be described.

Figure 21:
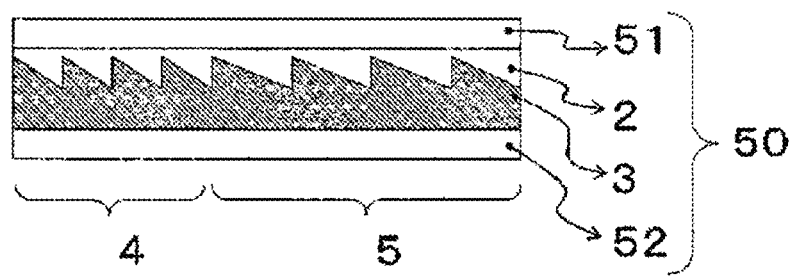
FIG. 21 is a sectional view illustrative of a structure of an optical element according to an eighth embodiment of the invention.

The optical element 50 includes a structural color layer 51 on a first layer 2 side and an electromagnetic wave absorption layer 52 on a second layer 3 side, as illustrated in FIG. 21.

Since total reflection or transmission dependent on an incidence angle by a first layer 2 and the second layer 3 differs between a first region 4 and a second region 5 having planes with different tilt angles, light is transmitted only through the first region 4 at a specific angle. In the present case, light in a specific wavelength region transmitted through the structural color layer 51 is absorbed by the electromagnetic wave absorption layer 52. The structural color layer 51 here may be, for example, a multilayered interference film, an interference pearl ink coating film, or a cholesteric liquid crystal, and also an interference structure achieved by a rectangular structure of a subwavelength depth.

The aforementioned structures scatter visible light in a specific wavelength region through, for example, refraction, interference, or scattering to generate a structural color. The structural colors include: those whose color tone varies depending on an observation angle (a combination of an incidence angle and an observation angle); and those which generate a specific color at a wide observation angle. Most of light in wavelength regions other than the aforementioned wavelength region is transmitted, and thus absorbing the transmitted light permits prevention of whitening of the structural color as a result of mixture of the light with the structural color and the transmitted light. Specifically, an absorption layer is required in order to obtain a clear color variation and a fixed color by the structural color layer 51. For example, a pigment or a dye may be used for the absorption layer, and carbon as a black pigment is typically used. However, any material other than the color materials may also be used as long as the material has an electromagnetic wave absorption property. For example, it is well-known that a moth-eye structure used in, for example, an antireflection structure provides an electromagnetic wave absorption effect by providing a relief structure thereof with a reflection layer, and the structures may be used as the electromagnetic wave absorption layer 52.

Ninth Embodiment

Next, an optical element 60 according to the ninth embodiment will be described.

Figure 22:
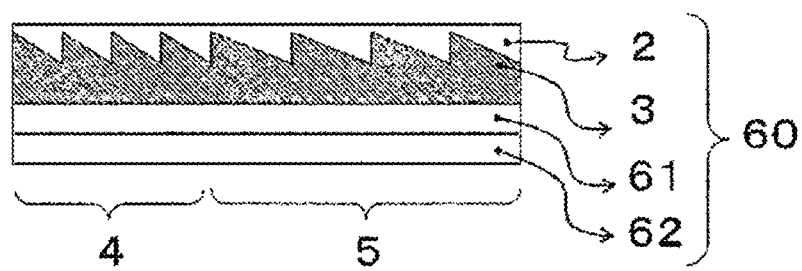
FIG. 22 is a sectional view illustrative of a structure of an optical element according to a ninth embodiment of the invention.

The optical element 60 includes a structural color layer 61 and an electromagnetic wave absorption layer 62 on a second layer 3 side, as illustrated in FIG. 22.

Since total reflection or transmission dependent on an incidence angle by a first layer 2 and a second layer 3 differs between a first region 4 and a second region 5 having planes with different tilt angles, it is possible to view a clear color variation and a fixed color as a result of superposition of the structural color layer 61 and the electromagnetic wave absorption layer 62 only in the first region 4 at a specific angle.

Tenth Embodiment

Next, an optical element 70 according to the tenth embodiment will be described.

Figure 23:
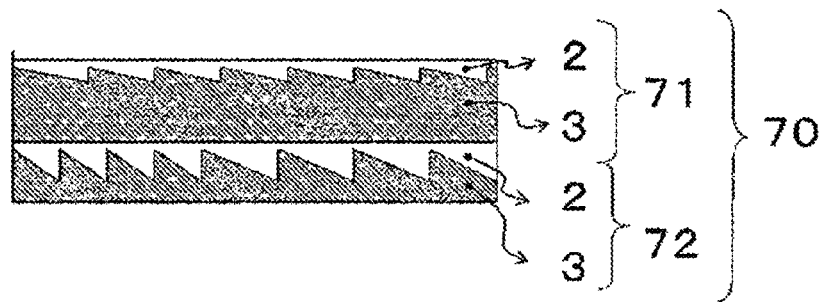
FIG. 23 is a sectional view illustrative of a structure of an optical element according to a tenth embodiment of the invention.

The optical element 70 has configuration such that an optical element 71 and an optical element 72 each formed by a first layer 2 and a second layer 3 are superposed on each other, as illustrated in FIG. 23.

Light transmitted through the optical element 71 depending on an incidence angle further creates, by the optical element 72, total reflection and transmission regions dependent on an incidence angle. Such a superposition structure may be used for the purpose of providing more complicated and fine optical effects. Note that the optical element 71 and the optical element 72 may partially be superposed on each other.

Moreover, a printing layer, a colored layer, a structural color layer 51 (61), and an electromagnetic wave absorption layer 52 (62) may be provided to modify the optical element 70, as in FIGS. 20 to 22.

Eleventh Embodiment

Next, an optical element 80 according to the eleventh embodiment will be described.

Figure 24:
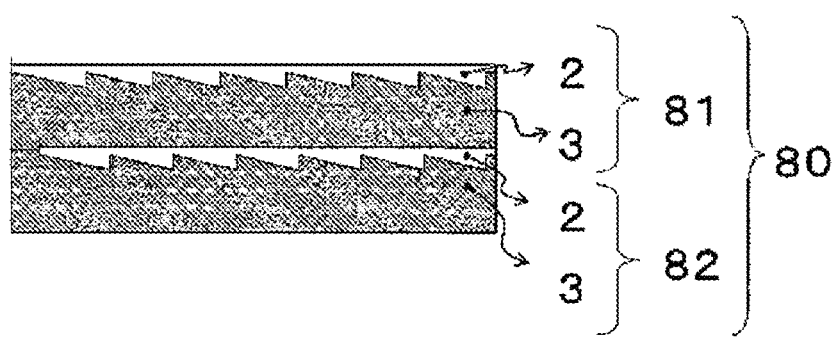
FIG. 24 is a sectional view illustrative of a structure of an optical element according to an eleventh embodiment of the invention.

The optical element 80 has configuration such that an optical element 81 and an optical element 82 each formed by a first layer 2 and a second layer 3 are superposed on each other, as illustrated in FIG. 24.

Both the optical element 81 and the optical element 82 have relief structures with cyclic structures, causing moire due to a difference between cycles thereof. To cause the moire, the cycle difference may be approximately 3% to 20%.

Moire is caused only in a region where both the optical element 81 and the optical element 82 permit transmission, thus making it possible to provide an effect that a given pattern of the moire moves, which effect makes it possible to further provide a stereoscopic effect.

Note that the portions may partially be superposed on each other. A printing layer, a colored layer, a structural color layer 51 (61), and an electromagnetic wave absorption layer 52 (62) may be provided to modify the optical element 80, as in FIGS. 20 to 22.

Twelfth Embodiment

Next, an optical element 90 according to the twelfth embodiment will be described.

Figure 25:
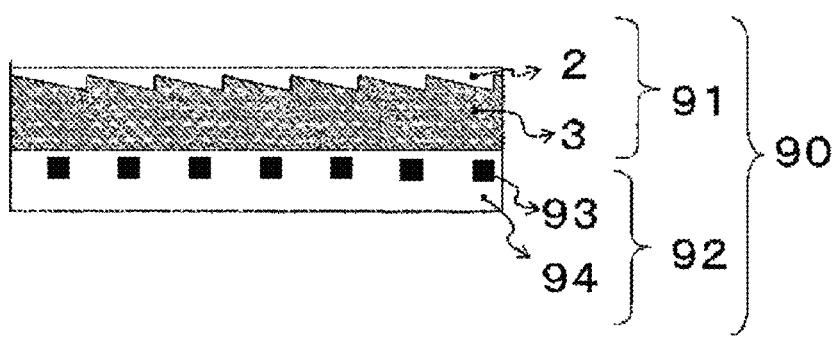
FIG. 25 is a sectional view illustrative of a structure of an optical element according to a twelfth embodiment of the invention.

The optical element 90 has configuration such that an optical element 91 formed by a first layer 2 and a second layer 3 and an optical element 92 including a cyclic printing pattern 93 formed on a printing base material 94 are superposed on each other, as illustrated in FIG. 25. Both the optical element 91 and the optical element 92 have cyclic structures, causing moire due to a difference between cycles thereof. To cause the moire, the cycle difference may be approximately 5% to 15%.

Since the moire is caused only in a region where the optical element 91 permits transmission, it is possible to provide an effect that a given pattern of the moire moves, and such an effect makes it possible to further provide a stereoscopic effect. The cyclic structure included in the optical element 92 may be a pattern provided through printing or a pattern obtained by etching metal, or may be obtained by patterning a structural color having diffraction, interference, and absorption effects.

The optical element 92 is composed of the cyclic printing pattern 93 and the printing base material 94 in FIG. 25.

Note that the portions may partially be superposed on each other. Moreover, a printing layer, a colored layer, a structural color layer 51 (61), and an electromagnetic wave absorption layer 52 (62) may be provided to modify the optical element 90, as in FIGS. 20 to 22.

Thirteenth Embodiment

Next, an optical element 100 according to the thirteenth embodiment will be described.

Figure 26:
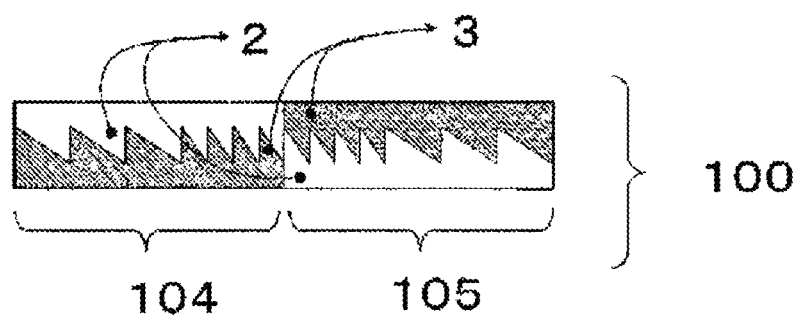
FIG. 26 is a sectional view illustrative of a structure of an optical element according to a thirteenth embodiment of the invention.

The optical element 100 has a third region 104 and a fourth region 105 which are vertically inverted as illustrated in FIG. 26.

In the present case, observation of any of the regions from a first layer 2 side makes it possible to confirm of total reflection and transmission patterns dependent on an incidence angle while observation thereof from a second layer 3 side results in a failure to observe total reflection.

Specifically, it is possible to confirm the total reflection and transmission patterns dependent on an incidence angle in either one of the regions when viewed from a front side while it is possible to confirm the total reflection and transmission patterns dependent on an incidence angle in different one of the regions when viewed from a rear side.

Note that the optical element 100 may be provided with a printing layer, a colored layer, a structural color layer 51 (61), and an electromagnetic wave absorption layer 52 (62) and may be superposed on the aforementioned optical elements and a moire-generating layer may be superposed to modify the optical element 90.

Fourteenth Embodiment

Next, an optical element 110 according to the fourteenth embodiment will be described.

Figure 27:
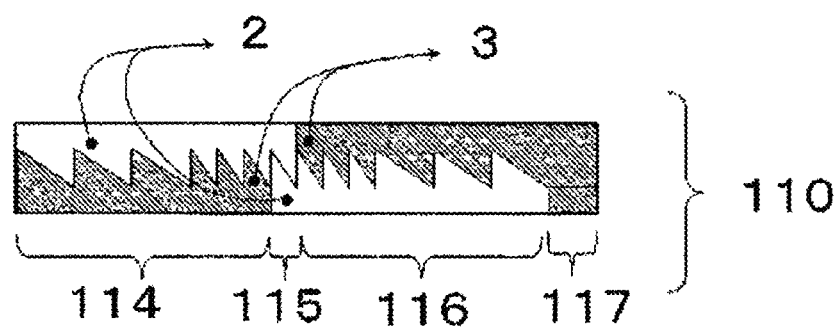
FIG. 27 is a sectional view illustrative of a structure of an optical element according to a fourteenth embodiment of the invention.

The optical element 110 has a fifth region 114 and a seventh region 116 which are vertically inverted as illustrated in FIG. 27. Moreover, a sixth region 115 has a relief structure resolved by a first layer 2 having the same refractive index. Further, an eighth region 117 has a relief structure resolved by a second layer 3 having the same refractive index.

In the present case, it is possible to confirm total reflection and transmission patterns dependent on an incidence angle in either one of the regions when viewed from a front side while it is possible to confirm total reflection and transmission patterns dependent on an incidence angle in different one of the regions when viewed from a rear side. In addition, it is possible to provide the sixth region 115 and the eighth region 117, in which the relief structure has been resolved, with a transmission region where no total reflection and no refraction occur.

Note that the optical element 110 may be provided with a printing layer, a colored layer, a structural color layer 51 (61), and an electromagnetic wave absorption layer 52 (62) and may be superposed on the aforementioned optical elements and a moire-generating layer may be superposed to modify the optical element 90.

Hereinafter, a method for producing a relief structure applicable to each of the aforementioned optical elements and materials of the respective layers will be described in detail.

(Details of Method for Producing Relief Structure)

Examples of representative techniques for continuous mass-duplication of relief structures include: "a heat embossing method", "a cast method", and "a photopolymer method".

Among the others, "the photopolymer method" (a 2P method, a photosensitive resin method) is capable of providing a high-definition, fine uneven pattern by pouring a radiation curable resin between a relief die (a die for duplicating a fine uneven pattern) and a flat base material (for example, a plastic film) and curing the resin by radiation and then removing a whole substrate with the cured film from the duplication die. Moreover, an optical element obtained by such a method has higher uneven pattern formation accuracy and more excellent thermal resistance and chemical resistance than those obtained by "a press method" or "the cast method" using a thermoplastic resin. Moreover, there are also, as new production methods, a method for performing formation by use of a solid or highly viscous photocurable resin at a normal temperature and a method for adding a release material.

In the present embodiment, a relief structure may be created with a material of the second layer 3 (23, 24) and then a material of the first layer 2 (22) may be applied in a manner such as to fill a relief or a relief structure may be created with the material of the first layer 2 (22) and then the material of the second layers 3 (23, 24) may be applied in a manner such as to fill the relief. Note that any method other than the present method is permitted as long as the method permits superposition of two layers with different refractive indexes on each other with a relief interface $IF_R$ provided therebetween.

To create the optical element according to the present embodiment, the first layer 2 (22) or the second layer 3 (23, 24) may be temporarily provided by being applied onto a support body of a film or paper and then a relief may be casted.

Further, molten resin of a resin material forming the first layer 2 (22) or the second layer 3 (23, 24) may be extruded onto a mold having a relief structure by using an extrusion embossing machine and then molded into a film shape to create the first layer 2 (22) or the second layer 3 (23, 24) having a relief structure as a film.

<Materials of First Layer 2 (22) and Second Layer 3 (23, 24)>

Examples of a material used for the first layer 2 (22) or the second layer 3 (23, 24) forming fine unevenness include: thermoplastic resins such as acrylic resins, epoxy-based resins, cellulosic resins, vinyl resins, polycarbonate-based resins; and thermosetting resins such as a urethane resin, melamine-based resins, epoxy-based resins, and phenolic resins obtained by adding and cross-linking, as a cross-linker, polyisocyanate to, for example, acrylic polyol or polyester polyol having a reactive hydroxyl group, which may be used alone or in combination. In addition, any material other than those described above may also be used as appropriate as long as the material permits formation of the aforementioned unevenness.

For the relief structure provision to a front surface of the first layer 2 (22) or the second layer 3 (23, 24), the photopolymer method may be used, in which case it is possible to use, as the material, for example, a monomer, an oligomer, or a polymer having an ethylenically unsaturated bond or ethylenically unsaturated group. Examples of the monomer include: 1, 6-hexane diol, neopentyl glycol diacrylate, trimethylol propane triacrylate, pentaerythritol triacrylate, pentaerythritol tetraacrylate, dipentaerythritol pentaacrylate, and dipentaerythritol hexaacrylate. Examples of the oligomer include: epoxy acrylate, urethane acrylate, and polyester acrylate. Examples of the polymer include: a urethane-modified acrylic resin and an epoxy-modified acrylic resin, although not limited thereto.

To use photo-cationic polymerization, it is possible to use a monomer having an epoxy group, an oligomer, a polymer, an oxetane-skeleton-containing compound, or vinyl ethers. Moreover, to cure the aforementioned ionizing radiation-curable resin with, for example, ultraviolet rays, it is possible to add a photopolymerization initiator. It is possible to make selection from a photo-radical polymerization initiator, a photo-cationic polymerization initiator, and a hybrid type using the both depending on the resin.

Further, it is also possible to use, for example, a monomer, an oligomer, and a polymer having an ethylenically unsaturated bond or an ethylenically unsaturated group in mixture. Moreover, it is also possible to previously provide the aforementioned substances with reaction groups and bridge the groups together with, for example, an isocyanate compound, a silane coupling agent, an organic titanate bridging material, an organic zirconium bridging material, or organic aluminate. Moreover, it is also possible to previously provide the aforementioned substances with reaction groups and bridge the groups with another resin skeleton with, for example, an isocyanate compound, a silane coupling agent, an organic titanate bridging material, an organic zirconium bridging material, or organic aluminate. With such methods, it is also possible to obtain a polymer which has an ethyrenically unsaturated bond or ethyrenically unsaturated group, and also which has less contamination in an original plate with favorable formability due to a solid state thereof at a normal temperature and also due to little tackiness thereof.

Examples of the photo-radical polymerization initiator include: benzoin-based compounds such as benzoin, benzoin methyl ether, and benzoin ethyl ether, anthraquinone-based compounds such as anthraquinone and methyl anthraquinone, phenyl ketone-based compounds such as acetophenone, diethoxyacetophenone, benzophenone, hydroxyacetophenone, 1-hydroxycyclohexyl phenyl ketone, α-aminoacetophenone, 2-methyl-1-(4-methylthio phenyl)-2-morpholinopropane-1-on, benzil dimethylketal, thioxanthone, acyl phosphine oxide, and Michler's ketone.

Examples of the photo-cationic polymerization initiator used in a case where a compound capable of photo-cationic polymerization is used include: an aromatic diazonium salt, an aromatic iodonium salt, an aromatic sulfonium salt, an aromatic phosphonium salt, and a mixed ligand metal salt. In case of a so-called hybrid type material using both photo-radical polymerization and photo-cationic polymerization, it is possible to mix polymerization initiators thereof for use and also possible to use, for example, an aromatic iodonium salt or an aromatic sulfonium salt having a function of initiating the both types of polymerization with the single type of initiator.

Blending of the radiation-curable resin and the photo polymerization initiator may be treated as appropriate depending on the material, but the blending is typically achieved by blending within a range of at least 0.1% by mass and no greater than 15% by mass. For resin composition, a sensitizing dye may further be used in combination with the photo polymerization initiator. Moreover, when necessary, for example, a dye, a pigment, various types of additives (for example, a polymerization inhibitor, a leveling agent, an anti-foaming agent, an anti-sagging agent, a sticking modifier, a painted surface improver, a plasticizing agent, or a nitrogen-containing compound), or a bridging agent (for example, an epoxy-based resin) may be included, and any of nonreactive resins (including the aforementioned thermoplastic resins and thermosetting resins) may be added for the purpose of formability improvement.

Moreover, the material may be selected taking into consideration: that the material is formable in an applied production method and has some degree of flowability; and that a coating film after the formation is provided with desired thermal resistance and chemical resistance.

The refractive index is important for the first layer 2 (22) and the second layer 3 (23, 24) in the present embodiment. Each of the layers may be of an inorganic material, an organic material, an organic-inorganic composite material. In addition, inorganic particulates, organic particulates, organic-inorganic composite particulates, and hollow particles may be added upon adjustment the refractive index of the organic material. In the present case, it is possible to provide a functional group on surfaces of the particulates to improve dispersion performance and film strength. Moreover, a disperser or a surfactant may be added to improve the dispersion performance of the particulates and a bridging agent may be added to improve the film strength.

(Relief Structure)

The relief structure according to the present embodiment lies at the interface between the first layer 2 (22) and the second layer 3 (23, 24), and partially has the tilted planes. Thus, a cross section of the relief structure has at least part of the interface with a given angle with respect to the plane of the optical element. The tilted plane according to the present embodiment has at least part of the interface with the given angle with respect to the plane of the optical element, and the angle may vary gradually. For example, a relief structure with a curved surface (curved surface in cross section) corresponds to the relief structure according to the present embodiment. Note that the tilted plane may have unevenness. In a case where a randomly uneven structure having a light scattering effect is provided on the tilted plane, an effect of dispersing reflected and transmitted light is provided, and thus, for example, it is also possible to provide an effect of providing gradation at a border between the reflection and transmission regions.

The relief structure according to the present embodiment may have a plurality of regions provided with a light condensing capability. Application of such a relief structure results in light scattering in the total reflection region dependent on the critical angle, leading to a failure to provide alight condensing effect but results in a success in providing a light condensing effect only in a region which permits transmission of light at an angle less than the critical angle. It is possible to achieve such a special phenomenon only by the present embodiment.

Moreover, a basic concept of the present embodiment lies in that light incident at an angle equal to or greater than the critical angle from the first layer 2 (22) side is totally reflected on the interface between the first layer 2 (22) and the second layer 3 (23, 24) while light incident at an angle less than the critical angle is transmitted from the first layer 2 (22) to the second layer 3 (23, 24) side, and thus along the concept, a third layer (not illustrated) may additionally be provided which follows the relief structure at the interface between the first layer 2 (22) and the second layer 3 (23, 24). In the present case, a refractive index of the third layer may be provided with a refractive index difference within ±0.2 preferably ±0.1 with respect to the first layer 2 (22) or the second layer 3 (23, 24). The refractive index difference in the aforementioned range permits a reduction in reflection on the interface between the first layer 2 (22) and the third layer 3 or on an interface between the second layer 3 (23, 24) and the third layer. Such a third layer is valid for the purpose of improving interlayer adhesion and resistance and for the purpose of correcting the relief structure. The third layer may be applied by a well-known method such as dry coating or wet coating.

(Colored Layer)

The colored layer according to the present embodiment may be a colored layer of a color material and may also be a light interference structure. Principles of an interference film having high-refraction films and low-refraction films alternately superposed on each other may be based on use of a multilayered interference film as disclosed in JP No. 2007-505509A. In addition, the interference structure may use a cholesteric liquid crystal. It is also possible to achieve light interference by the relief structure, and the aforementioned interference structure bodies may be used.

(Printing Layer)

A basic concept of the present embodiment lies in that light incident at an angle equal to or greater than the critical angle from the first layer 2 (22) side is totally reflected on the interface between the first layer 2 (22) and the second layer 3 (23, 24) while light incident at an angle less than the critical angle is transmitted from the first layer 2 (22) to the second layer 3 (23, 24) side. As a result of providing the printing layer to make contact with the second layer 3 (23, 24) side, it is possible to confirm the printing layer over the first layer 2 (22) and the second layer 3 (23, 24) only through observation at an angle less than the critical angle from the first layer 2 (22) side.

The printing layer is a layer at which information such as, for example, characters, images, and two-dimensional codes, is drawn. The printing layer may be obtained by printing a pigment or a dye on a base material of, for example, paper, plastic, metal, or glass.

Moreover, the base material may be modified through irradiation of, for example, a laser for printing, and for example, some of sheets of polycarbonate are modified through laser irradiation to cause black printing, which may be used. Further, printing may be performed by, for example, a hologram or a diffraction grating. The aforementioned printing methods and materials may appropriately be selected from those well-known.

(Structural Color Layer)

The structural color layer 51 (61) according to the present embodiment is a layer where optical effects are provided by a structure. For example, optical effects such as absorption, scattering, interference, and refraction are provided by the structure for visible light in a given wavelength region.

Examples of such a structural color layer 51 (61) include layers including structures such as a multilayered interference film, a relief type interference structure, a relief type diffraction grating, a volume type diffraction grating, a lens, a relief type scattering structure, a volume type scattering structure, and a cholesteric liquid crystal.

(Moire-Generating Structure)

The moire is also called an interference stripe, i.e. a stripe pattern which visually appears due to cycle mismatching between a plurality of regularly repeated patterns superposed on each other.

A cyclic relief structure or a cyclic printing layer is listed as an example of the moire-generating structure in the present embodiment. Installation of two layers with slightly different cyclic properties at a fixed distance therebetween causes different types of moire depending on observation angles. A continuous moire variation with the observation angle varied has an effect like a moving image. For example, in a case where a cyclic relief structures or a cyclic printing layer is provided above or below the optical element described in FIG. 1 and a cycle of the structure arranged thereabove or therebelow is slightly varied, moire is caused by the upper and lower layers only at an observation angle at which the optical element does not cause total reflection. To cause the moire, a cycle difference may be approximately 3% to 20%, although not limited thereto.

(Electromagnetic Wave Absorption Layer)

The electromagnetic wave absorption layer 52 (62) according to the present embodiment has an effect of absorbing electromagnetic waves which have been transmitted through the structural color layer 51 (61). For example, in case of an interference structure body such as a multilayered interference film or a cholesteric liquid crystal, reflections occurs for a specific wavelength while transmission occurs for the other wavelength regions. In a case where the transmitted light is reflected on any of the interfaces, the reflected light and the transmitted light provided by the structure are mixed together, and color concentration of the original reflected light becomes weaker due to the additive color mixture. To prevent such a color concentration reduction of the structural color in the present embodiment, the electromagnetic wave absorption layer 52 (62) is provided below the structural color layer 51 (61). The electromagnetic wave absorption layer 52 (62) may be an electromagnetic wave absorption structure similar to a color material such as a pigment or a dye absorbing electromagnetic waves in a specific region, for example, a pigment of carbon black or a moth-eye structure.

Designability and forgery proof performance of the optical element according to the present embodiment may be improved by providing an antireflection structure for the purpose of suppressing reflection and scattering on each layer surface, by coloring each of the layers for the purpose of designability improvement, by combining a well-known optical element for forgery proof instead of the printing layer, or by incorporating an existing optical element for forgery proof in the relief.

Note that, for example, in case of the optical elements 30 and 31 each formed of only the first layers 33, 34, and 35, it is possible to produce the optical elements 30 and 31 by using the aforementioned method for producing the first layer 2 (22) and the material thereof.

EXAMPLES

Example will be described below.

Example 1

HYPERTECH (registered trademark) UR-108N was used as "first layer ink composition" for forming "the first layer with an uneven structure of a cutting blade shape" in processes of producing the optical element according to the present embodiment. After applying the first layer ink composition, a roll photopolymer method was used as a method for forming the uneven structure of a cutting blade shape.

The "first layer ink composition" was coated on a support body formed of a 23 μm-thick transparent polyethylene terephthalate (PET) film by a gravure printing method to provide the first layer ink composition with a thickness of 10 μm. Then formation processing was carried out on the coated surface by extruding a cylindrical original plate having an uneven structure of a cutting blade shape with a press pressure of 2 kgf/cm2, at a press temperature of 80° C., and a press speed of 10 m/min.

Simultaneously with the formation, ultraviolet ray exposure at 300 mJ/cm2 was performed with a high-pressure mercury lamp from over the PET film, whereby the uneven shape of the original plate was shape-transferred to "the first layer" and cured at the same time. The "uneven structure of a cutting blade shape" in the first layer after the formation was an uneven structure of a cutting blade shape which has a first region with a depth of 5 μm and a cycle of 5 μm and a second region with a depth of 5 μm and a cycle of 10 μm and which is formed of a perpendicular surface and an oblique surface. Note that the refractive index of the first layer molded with the uneven structure of a cutting blade shape was 1.76.

Next, to install a second layer on an uneven surface of the first layer, DEFENSER (registered trademark) OP-38Z was applied as "second layer ink composition", ultraviolet ray exposure at 300 mJ/cm2 was performed with a high-pressure mercury lamp under nitrogen purge environment, and then drying was performed. The OP-38Z had a refractive index of 1.38 after cured. The optical element according to Example 1 was obtained in the manner described above.

Example 2

"A first layer with an uneven structure of a cutting blade shape" was created by the same method as that employed in Example 1. The "uneven structure of a cutting blade shape" in the first layer after the formation has a depth of 5 μm and a cycle of 5 μm.

Next, to install a second layer in a first region on an uneven surface of the first layer, DEFENSER (registered trademark) OP-38Z was applied as "second layer ink composition", and ultraviolet exposure at 300 mJ/cm2 was performed with a high pressure mercury lamp under nitrogen purge environment, and drying was performed to obtain an optical element. The OP-38Z had a refractive index of 1.38 after cured.

Next, to install a second layer in a seconder region on the uneven surface of the first layer, HITALOID (registered trademark) 7663 was applied as "second layer ink composition", ultraviolet exposure at 400 mJ/cm$^2$ was performed with a high pressure mercury lamp under nitrogen purge environment, and drying was performed. The 7663 had a refractive index of 1.58 after cured. The optical element according to Example 2 was obtained in the manner described above.

Comparative Example 1

After "a first layer with an uneven structure of a cutting blade shape" was created by the same method as that employed in Example 1, zinc sulfide was evaporated as a highly refractive transparent reflection layer at 700 Å. Then a second layer was provided on the uneven structure in which the zinc sulfide was evaporated, by the same method as that employed in Example 1 to obtain an optical element according to Comparative Example 1.

Comparative Example 2

After "a first layer with an uneven structure of a cutting blade shape" was created by the same method as that employed in Example 1, aluminum was evaporated as a metal reflection layer at 400 Å. Then a second layer was provided on the uneven structure, in which aluminum was evaporated, by the same method as that employed in Example 1 to obtain an optical element according to Comparative Example 2.

Comparative Example 3

An optical element according to Comparative Example 3 was obtained by the same method as that employed in Example 1 except for a point that HYPERTEC (registered trademark) UR-108N was used as "second layer ink composition".

<Method for Evaluating Optical Elements Created in Examples and Comparative Examples>
<Evaluation of Optical Effects>

In observation of the optical elements created in Examples 1 and 2 and Comparative Examples 1, 2, and 3 from front and rear sides, "OK" was provided for a case where clearly different optical effects were confirmable on the front side and the rear side while "NG" was provided for a case where almost the same optical effects were obtained on the front side and the rear side.

<Transparency Evaluation>

Full-page printing of "TP" in black was performed on high-quality printing paper in an MS Mincho font with a size of 16 by using an inkjet printer to create a printing layer, and then the already printed high-quality paper was laid below the optical elements created in Examples 1 and 2 and Comparative Examples 1, 2, and 3, and printing visibility over a display body was evaluated.

"OK" was provided for a case where the printing was clearly read in observation from a specific angle region and the printing was not clearly read in observation from any region other than the specific angle region while "NG" was provided for a case where the printing was not vividly confirmable from any angle and a case where the printing was vividly confirmable from any angle.

Using the aforementioned evaluation method, each of Examples and Comparative Examples were evaluated, the results of which are summarized in Table 1.

TABLE 1

| Configuration | Optical effects | Transparency |
|---|---|---|
| Example 1 | OK | OK |
| Example 2 | OK | OK |
| Comparative Example 1 | NG | NG |
| Comparative Example 2 | NG | NG |
| Comparative Example 3 | NG | NG |

As in Table 1, both the optical effects and the transparency were achieved in Examples, but both the optical effects and the transparency were insufficient in Comparative Examples.

In Example 1, both the first and second regions had favorable transparency in observation performed perpendicularly to the plane of the optical element from the first layer side. The first region has no transparency, resulting in a concentration contrast between the first region and the second region in observation performed at an angle of 20° with respect to a perpendicular line of the optical element. Moreover, the transparency was high in any of the regions at any observation angle in observation performed from the second layer side.

In Example 2, both the first and second regions had favorable transparency in observation performed perpendicularly to the plane of the optical element from the first layer side, and the first region had no transparency, resulting in a concentration contrast between the first and second regions in observation performed from an angle of 15°. In addition, both of the regions had high transparency at any observation angle in observation performed from the second layer side.

It is possible in Comparative Example 1 to observe the optical effects of the relief by the highly refractive transparent film provided along the relief in both observation performed from the first layer side and observation performed from the second layer side, resulting in a failure to obtain clearly different optical effects on the front side and the rear side.

It is possible in Comparative Example 2 to observe the optical effects of the relief in both observation performed from the first layer side and observation performed from the second layer side by the highly refractive transparent film provided along the relief, resulting in a failure to obtain clearly different optical effects on the front side and the rear side.

In Comparative Example 3, there is no relief interface $IF_R$ due to a resin having the first layer and the second layer with the same refractive index, obtaining no optical effect in both observation performed from the first layer side and observation performed from the second layer side.

EFFECTS OF THE EMBODIMENTS

The invention according to the present embodiments provides the following effects.

(1) In the optical element according to the present embodiment, the first layer 2 (22) is arranged on the second layer 3 (23, 24) having a relief structure on a surface thereof, at least the first region 4 and the second region 5 are provided, the first layer 2 (22) and the second layer 3 (23, 24) have mutually different refractive indexes, electromagnetic waves incident at a preset specific angle from the first layer 2 (22) side are totally reflected due to at least one of the relief structure in the first region 4 and a ratio of the refractive index of the second layer 3 (23, 24) with respect to the refractive index of the first layer 2 (22), the electromagnetic waves incident at the specific angle from the first layer 2 (22) side are not totally reflected but transmitted or refracted due to at least one of the relief structure in the second region 5 and the ratio of the refractive index of the second layer 3 (23, 24) with respect to the refractive index of the first layer 2 (22), and only in observation performed from the specific angle on the first layer 2 (22) side, at least the second region 5 has higher transparency than the first region 4 and a preset image is expressed by a transparency contrast between the first region 4 and the second region 5.

With such configuration, in use with a transparent base material provided, clearly different ways of viewing are achieved on a front side and a rear side, providing an optical element in which effects provided by the rear side observation are not recognized in the front side observation.

Moreover, in use with an opaque base material (a printing layer, a pattern layer) provided, an optical element is provided which has different reflection and transmission patterns depending on an observation angle. Thus, the reflection layer of metal or a highly refractive film is no longer required, resulting in a preferable optical element for forgery proof as a transparent optical element which permits transmission at a given incidence angle and permits reflection at a different given angle.

As described above, with the optical element according to one embodiment of the invention, it is possible to provide a versatile optical element applicable both to an optical element required in a bank bill field and to an optical element required in an ID field.

(2) Moreover, in the present embodiment, the second layer 3 (23, 24) may have the lower refractive index than the first layer 2 (22), the relief structure may have the tilted plane 6 tilted with respect to the plane of the optical element, and formulae 10 and 11 may be satisfied upon observation performed from a given observation point with a light source placed on an observation point OP1:

$$\theta_{f1} \geq \arcsin(N_2/N_1) \quad \text{(Formula 10)}$$

$$\arcsin(N_4/N_3) > \theta_{f2} \quad \text{(Formula 11)}$$

where $\theta_{f1}$ denotes an incidence angle on the tilted plane 6 of the relief structure in the first region 4, $\theta_{f2}$ denotes an incidence angle on the tilted plane 8 of the relief structure in the second region 5, $N_1$ denotes the refractive index of the first layer 2 (22) in the first region 4, $N_2$ denotes the refractive index of the second layer 3 (23, 24) in the first region 4, $N_3$ denotes the refractive index of the first layer 2 (22) in the second region 5, and $N_4$ denotes the refractive index of the second layer 3 (23, 24) in the second region 5.

With such configuration, it is possible to gradually vary the pattern by a gradual variation in the observation point. Thus, it is possible to further improve the designability and the forgery proof performance.

(3) Moreover, in the present embodiment, the third layer, such as the background layer 41, arranged in a manner such as to make contact with the second layer 3 (23, 24) may be provided, and the third layer may be a printing layer on which at least one of a symbol and an image pattern is written.

With such configuration, it is possible to confirm the printing layer as the third layer over the first layer 2 (22) and the second layer 3 (23, 24). Thus, it is possible to further improve the designability and the forgery proof performance.

(4) Moreover, in the present embodiment, the fourth layer, such as the background layer 41, arranged to make contact with the second layer 3 (23, 24) may be provided, and the fourth layer may be a colored layer.

With such configuration, it is possible to confirm the colored layer as the fourth layer over the first layer 2 (22) and the second layer 3 (23, 24). Thus, it is possible to further improve the designability and the forgery proof performance.

(5) Moreover, in the present embodiment, the fifth layer arranged to make contact with a surface of the fourth layer opposite to the second layer 3 (23, 24) may be provided, and the fifth layer may be the electromagnetic wave absorption layer 62. Note that, in the present case, the aforementioned fourth layer may be provided as the structural color layer 61 as one embodiment of the background layer 41.

With such configuration, it is possible to prevent a color concentration reduction of the structural color. Thus, it is possible to further improve the designability and the forgery proof performance.

(6) Moreover, in the present embodiment, the sixth layer arranged to make contact with the first layer 2 (22) and the seventh layer arranged to make contact with the second layer 3 (23, 24) may be provided, and the sixth layer may be a colored layer and the seventh layer may be the electromagnetic wave absorption layer 52. Note that the aforementioned sixth layer may be provided as the structural color layer 51 in the present case.

With such configuration, it is possible to confirm the colored layer as the sixth layer over the first layer 2 (22) and the second layer 3 (23, 24) and also possible to prevent the color concentration reduction of the structural color. Thus, it is possible to further improve the designability and the forgery proof performance.

(7) Moreover, in the present embodiment, configuration such that the two or more optical element for forgery proof described above may be superposed on each other may be provided. Note that the configuration such that the two or more optical element for forgery proof are superposed on each other refers to, for example, configuration such that the optical elements 71, 81, and 91 and the optical elements 72, 82, and 92 are superposed on each other.

With such configuration, it is possible to further improve the designability and the forgery proof performance.

(8) In the present embodiment, the at least two superposed layers of the optical element may have cyclic relief structures, and the two cyclic relief structures may cause moire. Note that the configuration such that the at least two superposed layers of the optical element have the cyclic relief structures refers to, for example, configuration such that the optical elements 71, 81, and 91 and the optical elements 72, 82, and 92 are superposed on each other.

With such configuration, it is possible to obtain an effect that a given pattern of the moire moves. Thus, it is possible to further provide a stereoscopic effect. Thus, it is possible to further improve the designability and the forgery proof performance.

(9) Moreover, in the present embodiment, at least part of the relief structure may have a cyclic structure, and an eighth layer capable of generating the cyclic structure and moire may be provided. Note that the aforementioned eighth layer refers to, for example, the optical elements 72, 82, and 92.

With such configuration, it is possible to provide the effect that the given pattern of the moire moves. Thus, it is possible to further provide a stereoscopic effect. Thus, it is possible to further improve the designability and the forgery proof performance.

(10) Moreover, in the present embodiment, when observed from a direction perpendicular to the plane of the optical element, at least one of the first region 4 and the second region 5 may generate a parallax image by a convergence angle defined by positions of both eyes and the optical element.

With such configuration, it is possible to achieve stereoscopic expression by the parallax image. Thus, it is possible to further improve the designability and the forgery proof performance.

The invention has been described above with reference to the specific embodiments, but the invention is not limited in any way by the descriptions provided above. With reference to the descriptions of the invention, other embodiments together with the disclosed embodiments also become clear to those skilled in the art. Therefore, it should be understood that the scope of the claims covers all the modified examples or the embodiments included in the range and the summary of the invention.

Hereinafter, an optical element not provided with the configuration according to the present embodiments will be briefly described as a comparative example (a reference example).

It is well-known that forgery proof is achieved by providing products in need of forgery proof, such as negotiable instrument, certificates, and luxury brands, with an element having an optical effect which is hardly imitated.

A hologram, a diffraction grating, a multilayered interference film, etc. are well-known as elements having such an optical effect. It has been assumed that the aforementioned elements have a fine structure or complicated layer configuration and are thus is difficult to easily analyze, thus permitting prevention of illegal duplication.

<Security in Bank Bill Field>

Watermark authentication permits confirmation of an effect thereof at one sight and thus has been treated as a forgery proof technology highly recognized by users in the conventional bank bill field. In recent years, polymer bank bills using a transparent polymer base material have been put into practice, more simplifying observation of the aforementioned optical element for forgery proof (for example, the hologram) from a front side and a rear side and watermark observation, so that watermark judgment has become an important method of determining a forgery product. From such a background, an optical element for forgery proof having a special watermark effect has drawn attention and has been demanded.

Patent Literature 1 suggests, for the aforementioned problem, a structure which has a reflection layer provided to an asymmetrical diffraction relief as a special optical element provided at a transparent window portion. The relief uses an opposing blaze structure, in which it is possible to confirm a first image generated by a first blaze in observation performed at a specific angle from the front side while it is possible to confirm a second image generated by a second blaze opposite to the first blaze in observation performed at a specific angle from the rear side. As described above, the different effects are provided on the front side and the rear side, permitting use as an optical element installed at the transparent window portion.

However, there arises a problem that effects attributable to the relief are observable on both the front side and the rear side since the reflection layer along the relief is provided, for example, a problem that the second mage is visible at some observation angle even upon confirmation of the first image from the front side. Such an ambiguous effect makes it extremely difficult to instantaneously judge whether or not a certain product is a forgery product.

Another example of Patent Literature 1 suggests a hollow mirror as the special optical element provided at the transparent window portion. The optical element has a reflection film provided to a relief of a lens shape. The reflective film has some degree of transparency and has a convex lens effect confirmable in observation of the window from the front side while having a concave lens effect confirmable in observation of the window from the rear side. For example, in a case where an object is installed adjacently to the lens, it is possible to confirm the object enlarged by the convex lens effect in the observation of the window from the front side while it is possible to confirm the object downsized by the concave lens effect in the observation of the window from the rear side. As described above, the different effects are obtained on the front side and the rear side, thus permitting use as the optical element installed at the transparent window portion.

However, the aforementioned optical element is only capable of confirming an enlarged image or a downsized image of a given object on the front side or the rear side. That is, what is observed on the front side and the rear side is the same object (picture), and thus the same object is only viewed from the front side and the rear side, providing similar effects. For example, printing an object at the window portion by using a transparent ink provides a similar effect, resulting in a failure to make discrimination from the aforementioned optical element at one sight, so that it is hard to say that a forgery proof effect is high.

That is, an optical element has been demanded in the bank bill field which is attached to a transparent base material, which is viewed in clearly different manners on a front side and a rear side, and in which effects provided by rear side observation are not recognized in front side observation.
<Security in ID Field>

On the other hand, a transparent optical element (for example, a hologram) has been used as a forgery proof structure in applications to the ID field, for example, an ID card or a passport which certifies an individual. The transparent optical element is laminated on a base material with printed specific information for use. Thus, even in a case where a printing layer with written specific information of a product has been confirmed over the optical element, easily confirmable transparency is provided, and special optical effects with a high contrast and favorable visibility are required.

Patent Literature 2 suggests, for the aforementioned problem, a special optical effect using transmitted light and reflected light by a tilted reflection plate. The optical element has a plurality of reflection plates tilted at a fixed angle in a fixed direction, and light is reflected in case of observation performed from a specific direction while the light is passed in case of observation performed from another specific direction, permitting confirmation of the printing layer with the written specific information of the product over the optical element. The element has the reflection layer, and thus has a high contrast between electromagnetic wave reflection and transmission and excellent visibility, thus permitting use as a transparent optical element for an ID card or a passport.

However, it is difficult to make the aforementioned optical element transparent at a given angle.

The tilted reflection plate itself has a reflective property as long as some incidence angle is formed with respect to the reflection plate. Thus, to make the optical element transparent at a given observation angle, the observation angle and the reflection plate need to be made parallel to each other. Even when the observation angle and the reflection plate are made parallel to each other, there arise a problem that the transparency is lost depending on a thickness of the reflection plate and the number of reflection plates. The transparency deterioration of the optical element is related to visibility of the printing layer provided below the optical element. Thus, it is important that the optical element be transparent at least in a specific observation angle region.

Specifically, a transparent optical element has been required in the ID field which is attached to an opaque base material (a printing layer, a pattern layer), which has different reflection and transmission patterns depending on an observation angle, which no longer requires a reflation layer of metal or a highly refractive film, and which permits transmission at a given incidence angle and performs reflection at a different given angle.

Note that the optical element disclosed in Patent Literature 2 performs control of transmitted light and reflected light by the tilted reflection plate and is thus capable of providing only similar optical effects on a front side and a rear side, thus resulting in a failure to satisfy the aforementioned "optical element attached to the transparent base materials".

Patent Literatures 3 and 4 suggest an optical element including a front surface of a V-shaped groove and a flat and smooth bottom surface. According to the Literatures, the optical element displays a light gradation pattern by refracting light, which has been totally reflected (the total reflection is not necessarily required in the present case) on the flat and smooth bottom surface, by the V-shaped groove on the front surface. The aforementioned structure raises a problem. For example, in a case where a black ink is directly printed on the flat and smooth surface, reflection does not occur on the bottom surface, resulting in a failure to provide a desired effect. The current problem is solved by, for example, providing a transparent reflection layer, but in a case where the reflection layer is added to the entire bottom surface, visibility of the printing layer installed below the optical element deteriorates depending on reflectance of the reflection layer. That is, the optical effect and the visibility of the printing layer fall in trade-off relationship.

Moreover, a serious contamination-related problem also arises. Since the front surface of the V-shaped groove is exposed, for example, the groove is contaminated by oil or water, resulting in a failure to provide the desired effect when the groove is filled.

INDUSTRIAL APPLICABILITY

With the optical element according to the present invention, it is possible to provide an optical element which has easily confirmable transparency and which is capable of providing a special optical effect with a high contrast and favorable visibility even in a case where the printing layer with the written specific information of the product has been confirmed over the display body. Thus, it is possible to use the optical element according to the invention for use in an ID card, a passport, or a bank bill which requires a high forgery proof effect.

REFERENCE SIGNS LIST

1: optical element
2: first layer
3: second layer
4: first region
5: second region
6: tilted plane
7: an incidence angle range less than critical angle
8: tilted plane
9: an incidence angle range less than critical angle
10: optical element
16: transmission pattern
17: total reflection pattern
20: optical element
21: optical element
22: first layer with a refractive index of 1.40
23: second layer with a refractive index of 1.49
24: second layer with a refractive index of 1.7
25: transmission pattern
26: total reflection pattern
30: optical element
31: optical element
33: first layer with a refractive index of 1.69
34: first layer with a refractive index of 1.50
35: first layer with a refractive index of 1.40
40: optical element
41: background layer
50: optical element
51: structural color layer
52: electromagnetic wave absorption layer
60: optical element
61: structural color layer
62: electromagnetic wave absorption layer
70: optical element
71: optical element
72: optical element
80: optical element
81: optical element
82: optical element
90: optical element
91: optical element
92: optical element
93: cyclic printing pattern
94: printing base material
100: optical element
104: third region
105: fourth region
110: optical element
114: fifth region
115: sixth region
116: seventh region
117: eighth region
$\theta$: tilt angle
$\theta_a$: incidence angle
$\theta_b$: refraction angle
$\theta_c$: critical angle
$\theta_r$: refraction angle
$\theta_f$: incidence angle
$\theta_4$: incidence angle
$\theta_5$: refraction angle
$\theta_6$: incidence angle
$\theta_7$: incidence angle
$\theta_8$: convergence angle

The invention claimed is:

1. An optical element for forgery proof comprising a first layer and a second layer, the optical element being divided into at least a first region and a second region, wherein,
the first layer is arranged on the second layer having a relief structure on a surface thereof, and the first layer and the second layer have mutually different refractive indexes,
electromagnetic waves incident at a preset specific angle from a side of the first layer are totally reflected due to at least one of the relief structure in the first region and a ratio of the refractive index of the second layer with respect to the refractive index of the first layer,
the electromagnetic waves incident at the specific angle from the side of the first layer are not totally reflected but transmitted or refracted due to at least one of the relief structure in the second region and the ratio of the refractive index of the second layer with respect to the refractive index of the first layer,
wherein when observed from a direction perpendicular to a plane of the optical element, at least one of the first region and the second region generates a parallax image by a convergence angle defined by positions of both eyes and the optical element, and
wherein
the second layer has the lower refractive index than the first layer, and the relief structure has an oblique surface tilted with respect to the plane of the optical element, and
upon observation performed from a given observation point with a light source placed on an observation point side, Formulae 1 and 2 are satisfied:

$$\theta_{f1} \geq \arcsin(N_2/N_1) \quad \text{(Formula 1)}$$

$$\arcsin(N_4/N_3) > \theta_{f2} \quad \text{(Formula 2)}$$

where
$\theta_{f1}$ denotes an incidence angle on the oblique surface of the relief structure in the first region,
$\theta_{f2}$ denotes an incidence angle on the oblique surface of the relief structure in the second region,
$N_1$ denotes the refractive index of the first layer in the first region,
$N_2$ denotes the refractive index of the second layer in the first region,
$N_3$ denotes the refractive index of the first layer in the second region, and
$N_4$ denotes the refractive index of the second layer in the second region.

2. The optical element for forgery proof according to claim 1, further comprises a third layer arranged in contact with the second layer, wherein,
the third layer is a printing layer on which at least one of a symbol and an image pattern is written.

3. The optical element for forgery proof according to claim 1, further comprises a fourth layer arranged in contact with the second layer, wherein
the fourth layer is a colored layer.

4. The optical element according forgery proof to claim 3, further comprises a fifth layer arranged in contact with a surface of the fourth layer opposite to the second layer, wherein
the fifth layer is an electromagnetic wave absorption layer.

5. The optical element for forgery proof according to claim 1, further comprises a sixth layer arranged in contact with the first layer and a seventh layer arranged in contact with the second layer, wherein the sixth layer is a colored layer and the seventh layer is an electromagnetic wave absorption layer.

6. An optical element for forgery proof configured to include two or more optical elements for forgery proof according to claim 1 superposed on each other.

7. The optical element for forgery proof according to claim 6, wherein the at least two superposed layers of the optical elements have cyclic relief structures, and the cyclic relief structures cause moire.

8. The optical element for forgery proof according to claim 1, wherein at least part of the relief structure has a cyclic structure, and the optical element further comprises an eighth layer configured to have the cyclic structure and to be capable of causing moire.

9. An optical element for forgery proof configured to include two or more optical elements for forgery proof according to claim 2 superposed on each other.

10. An optical element for forgery proof configured to include two or more optical elements for forgery proof according to claim 3 superposed on each other.

11. An optical element for forgery proof configured to include two or more optical elements for forgery proof according to claim 4 superposed on each other.

12. An optical element for forgery proof configured to include two or more optical elements for forgery proof according to claim 5 superposed on each other.

13. The optical element for forgery proof according to claim 2, wherein at least part of the relief structure has a cyclic structure, and the optical element further comprises an eighth layer configured to have the cyclic structure and to be capable of causing moire.

14. The optical element for forgery proof according to claim 3, wherein at least part of the relief structure has a cyclic structure, and the optical element further comprises an eighth layer configured to have the cyclic structure and to be capable of causing moire.

* * * * *